United States Patent
Tsuchida

[19]

[11] Patent Number: 6,130,787
[45] Date of Patent: Oct. 10, 2000

[54] OPTICAL SYSTEM AND OPTICAL MODULE

[75] Inventor: Hirofumi Tsuchida, Kunitachi, Japan

[73] Assignee: Olympus Optical Co., Ltd., Tokyo, Japan

[21] Appl. No.: 09/164,378

[22] Filed: Oct. 1, 1998

[30] Foreign Application Priority Data

Oct. 2, 1997 [JP] Japan .................................... 9-284282

[51] Int. Cl.[7] .................................................. G02B 3/00
[52] U.S. Cl. ........................... 359/654; 359/652; 359/653
[58] Field of Search .................... 359/652, 653, 359/654

[56] References Cited

U.S. PATENT DOCUMENTS

| | | |
|---|---|---|
| 4,639,094 | 1/1987 | Aono . |
| 5,184,251 | 2/1993 | Tsuchida .................. 359/654 |
| 5,448,409 | 9/1995 | Noda . |

FOREIGN PATENT DOCUMENTS

| | | |
|---|---|---|
| 59-62816 | 4/1984 | Japan . |
| 6-157069 | 6/1994 | Japan . |
| 9-49966 | 2/1997 | Japan . |

*Primary Examiner*—Georgia Epps
*Assistant Examiner*—Michael A. Lucas
*Attorney, Agent, or Firm*—Pillsbury Madison & Sutro LLP

[57] ABSTRACT

An optical system comprising a radial type gradient index lens element which has a negative refractive power of medium and a negative refractive power as a whole, and a radial type gradient index lens element which has a negative refractive power of medium and a negative refractive power as a whole; the optical system having favorable imaging performance: and an optical module using the optical system which is suited for stereoscopic photography and automatic focusing.

26 Claims, 17 Drawing Sheets

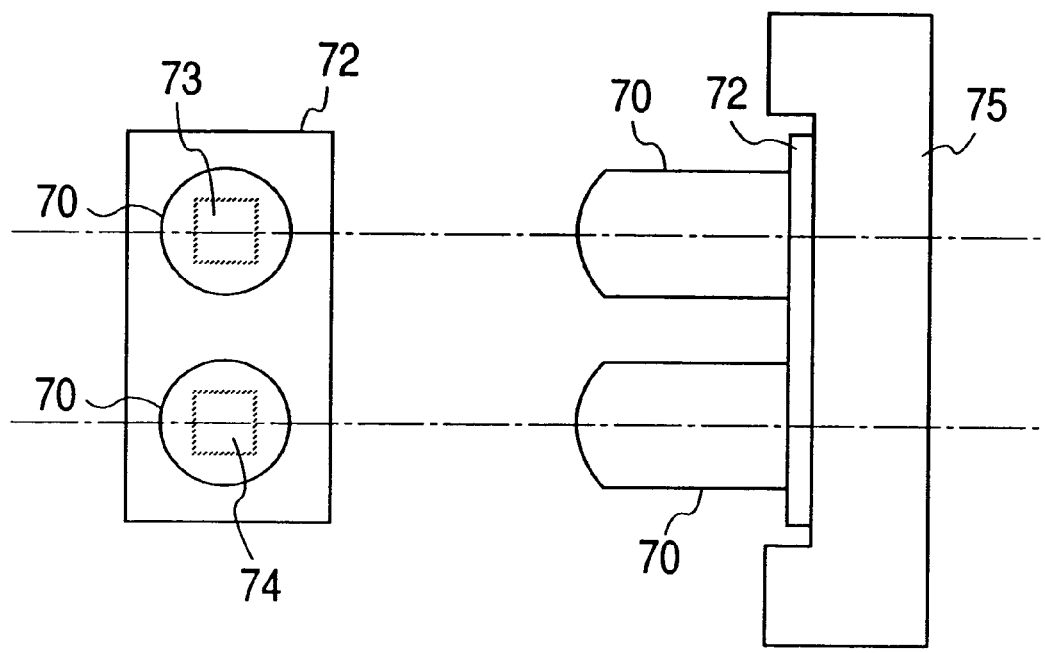
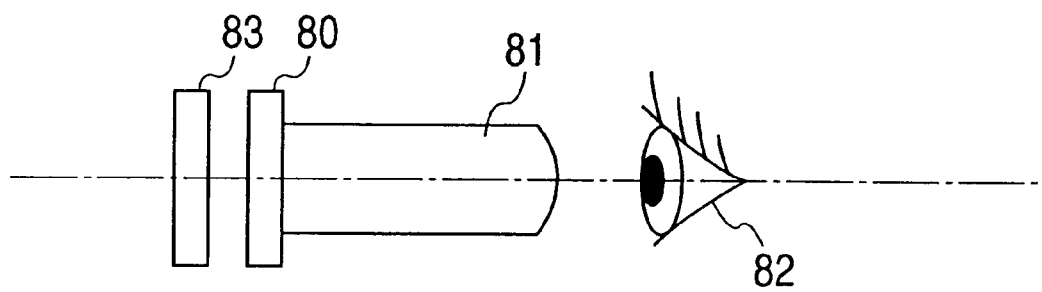

OPTICAL SYSTEM AND OPTICAL MODULE

BACKGROUND OF THE INVENTION a) Field of the Invention

The present invention relates to an optical system to be used with optical instruments and an optical module for carrying out stereoscopic photography, automatic focusing, etc. using the optical system.

b) Description of the Prior Art

In the recent years, there have been prevailing cameras for electronically picking up images such as those used in domestic video cameras, TV cameras, doorphones with cameras and so on. A great theme therefore lies in compact configuration and reduction of manufacturing costs of lens systems to be used in these cameras. A lens system which has a fixed focal length and is to be used in such a camera is generally composed of three to six lens elements.

For stereoscopic photography or automatic focusing, it is ordinarily required to use two optical systems, (left and right) or twice as many lens elements as are used in an ordinary lens system.

A lens system such as the conventional lens system described above which is composed of three to six lens elements uses a large number of lens elements and adopts a lens barrel which has a complicated structure to fix these lens elements, thereby requiring a high manufacturing cost. Further, such a lens system poses a problem that its performance is degraded due to eccentricities of individual lens elements produced at stages of working and assembly.

When two optical systems are required for stereoscopic photography, it is necessary to use two lens systems and accurately align these two lens systems.

SUMMARY OF THE INVENTION

A primary object of the present invention is to provide an optical system which is composed of a small number of lens elements, has a simple composition and exhibits sufficient optical performance.

Another object of the present invention is to provide an optical system and an optical module which are suited for composing binocular systems for stereoscopic photography, automatic focusing and so on.

BRIEF DESCRIPTION OF THE DRAWINGS

FIGS. 31A and 31B show sectional views exemplifying an image pickup module which uses two lens systems; and FIG. 32 shows a diagram illustrating a composition of a display optical system which uses the lens system according to the present invention.

DETAILED DESCRIPTION OF THE PREFERRED EMBODIMENTS

Figure 1:
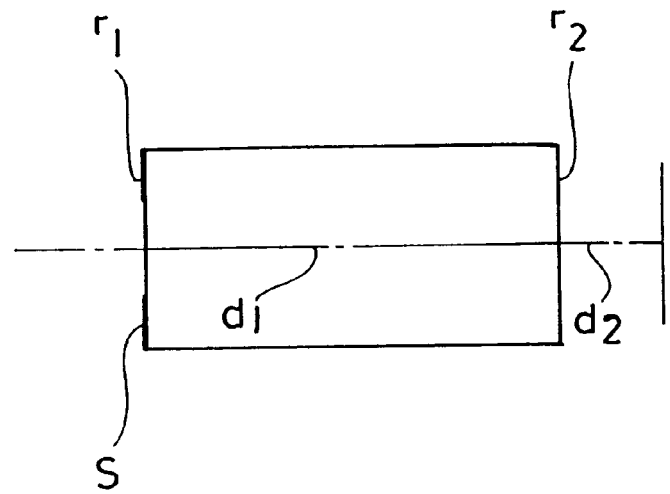
FIG. 1 shows a sectional view illustrating a conventional radial type gradient index lens element.

The optical system according to the present invention which has a first composition is characterized in that it consists, in order from the object side, of a radial type gradient index lens element which has a negative refractive power of medium and a negative refractive power as a whole, and a radial type gradient index lens element which has a positive power of medium and a positive refractive power as a whole; and that it satisfies the following conditions (1) and (2):

(1) $|1/V_{1n}| < 0.02$ (2) $|1/V_{1p}| < 0.02$ wherein the reference symbol $V_{1n}$ represents an Abbe's number of a medium of the radial type gradient index lens element which has the negative refractive power and the reference symbol $V_{1p}$ designate an Abbe's number of a medium of the radial gradient index lens element which has the positive refractive power.

The optical system according to the present invention which has a second composition is characterized in that it comprises a lens system consisting of a plurality of lens elements and an image pickup device or a display device disposed on the image side of the lens system; and that it is composed so as to form no air layer between the lens elements or between the lens system and the image pickup device or the display device. In other words, the lens elements are kept in close contact with one another or cemented to one another, and a final surface of the lens system and the image pickup device or the display device are kept in close contact with each other or cemented to each other or a resin such as an epoxy resin is filled in airspaces between the lens elements, and an airspace between the lens element and the image pickup device or the display device in the optical system according to the present invention which has the second composition.

The optical module according to the present invention which has a third composition is characterized in that it consists of two lens systems each comprising a radial type gradient index lens element and a substrate of image pickup device, and that the lens systems and the substrate of image pickup device are integrated to compose the optical module by bringing final surfaces of the two lens systems into close contact with a surface of the substrate of image pickup device.

The lens system according to the present invention which has a fourth composition is characterized in that it is composed of a single convexo-planar leas element, that it comprises an aperture stop disposed in the lens element, that it is configured to have an image surface in the vicinity of an image side surface (planar surface) of the lens element and that it satisfies tie following condition (5):

(5) $0.2 < ds/f < 0.8$ wherein the reference symbol ds represents a distance as measured from a vertex of a convex surface of the lens element to the aperture stop in a direction along an optical axis and the reference symbol f designates a focal length of the lens element.

First, description will be made of the optical system according to the present invention which has the first composition.

In order to obtain an optical system which consists of lens element in a number as small as possible and has a simple composition, the present invention uses radial type gradient index lens elements which have high capabilities to correct aberrations.

A radial type gradient index lens element is made of a medium having a refractive index distribution in a direction perpendicular to an optical axis which is expressed by the following formula (a):

$$n(r) = N_0 + N_1 r^2 + N_2 r^4 + N_3 r^6 + \ldots \quad (a)$$

wherein the reference symbol $N_0$ represents a refractive index on the optical axis at a standard wavelength, the reference symbols $N_1, N_2, N_3, \ldots$ designate coefficients expressing a refractive index distribution at the standard wavelength, and the reference symbol r denotes a distance from the optical axis.

Further, Abbe's numbers $V_0$ and $V_1$ of the radial type gradient index lens element are given by the following formulae (b) and (c) respectively:

$$V_0 = (N_{0d} - 1)/(N_{0F} - N_{0C}) \quad (b)$$

$$V_i = N_{id}/(N_{iF} - N_{iC}) \; (i = 0, 1, 2, \ldots) \quad (c)$$

wherein the reference symbol $N_i \lambda$ ($i = 0, 1, 2, \ldots$) represents a coefficient which expresses a refractive index distribution at a wavelength $\lambda$, and the reference symbols $N_{id}$, $N_{iF}$ and $N_{iC}$ designate coefficients for the d-line, F-line and C-line respectively.

Further, a partial dispersion ratio $P_i$ ($i = 0, 1, 2, \ldots$) of the radial type gradient index lens element is given by the following formula (d):

$$P_i = (N_{id} - N_{iC})/(N_{iF} - N_{iC}) \quad (d)$$

As lens systems which use radial type gradient index lens elements and have simple compositions, there are known a lens system disclosed by Japanese Patent Kokai Publication No. Hei 9-49966 which is composed of a single radial type gradient index lens element having two planar surfaces, and a lens disclosed by Japanese Patent Kokai Publication No. Sho 59-62816 which is composed of a combination of a radial type gradient index lens element having a negative refractive power and a radial type gradient index lens element having a positive refractive power.

Out of these conventional examples, the lens system disclosed by Japanese Patent Kokai Publication No. Hei 9-49966 requires a material which has a large refractive index difference (maximum refractive index difference) Δn between a central portion and a marginal portion for obtaining a large field angle of the lens system. Since it is difficult to manufacture such a material, the lens system can hardly have a large field angle.

Further, the lens system disclosed by Japanese Patent Kokai Publication No. Sho 59-62816 which is composed of the combination of the radial type gradient index lens element having a negative refractive power and the radial type gradient index lens element having a positive refractive power is a light pickup lens system which is designed according to the monochromatic theory with nearly no consideration for offaxial performance thereof.

Now, let us therefore consider to compose a lens system of a single radial type gradient index lens element which has two planar surfaces and is made of a material which can easily be manufactured.

In order to obtain a material which can easily be manufactured, Japanese Patent Kokai Publication No. Hei 6-157069 discloses a method to manufacture a material which has a low dispersive property, or a maximum refractive index difference Δn on the order of 0.05, by adequately distributing Ba ions and Ti ions. As a material which can be manufactured by this method, we presumed a material GP which has values listed in following Table 1:

TABLE 1

| $N_0$ = 1.70000, | $N_1$ = −1.000 × 10$^{-2}$, | $N_2$ = 0 |
|---|---|---|
| $V_0$ = 40.00, | $V_1$ ($V_{1p}$) = 500.0 | |
| $P_0$ = 0.295, | $P_1$ = 0.295 | |
| effective diameter = 4 mm, | Δn = 0.04 | |

Using this material GP, we designed a plane parallel radial type gradient index lens element which is shown in FIG. 1 as a lens system which has the following numerical data:
f=6.0 mm, F/2.8, IH=2.0 mm, 2ω=38.7°,
effective diameter=4 mm
$r_1 = \infty$ (stop) $d_1 = 10.4065$
Material GP having numerical data listed in Table 1
$r_2 = \infty$ $d_2 = 2.5668$ (back focal length)

A stop is disposed on a first surface of the lens system descried above so that Δn required for the material is reduced, and longitudinal chromatic aberration and lateral chromatic aberration can be corrected to levels allowable for practical use. A principle to correct aberration in this lens system is shown in following Table 2:

TABLE 2

| aberration | correcting parameter | correction level |
| --- | --- | --- |
| spherical aberration | $N_2$ | allowable |
| coma | $N_2$ | allowable |
| astigmatism | lens thickness | corrected |
| curvature of field | power of medium (electrical) | allowable |
| distortion |  | not corrected |
| longitudinal chromatic aberration | $V_1$ | corrected |
| lateral chromatic aberration | $V_1$, stop position | allowable |

Figure 2:
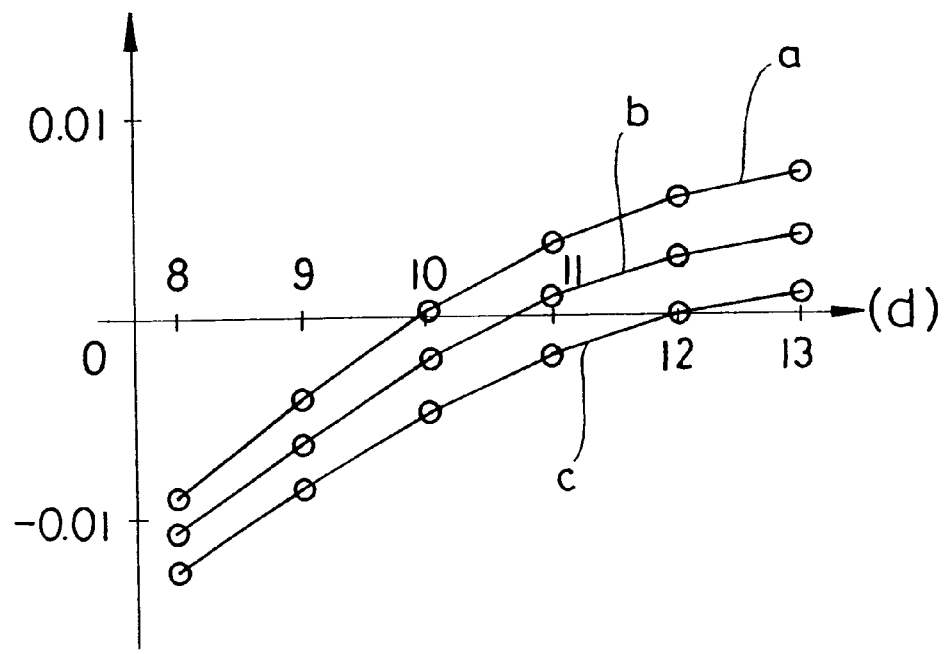
FIG. 2 shows a diagram illustrating relationship between thickness of a radial type gradient index lens element and astigmatism.

As shown in Table 2, coma and spherical aberration can be controlled with the parameter $N_2$, whereas astigmatism can be controlled with the lens thickness d. Relationship among the parameter $N_2$ (the refractive index distribution coefficient $N_2$), the lens thickness d and astigmatism to be produced is shown in FIG. 2, wherein a curve a corresponds to $N_2=2\times10^{-5}$, a curve b corresponds to $N_2=0$ and a curve c corresponds to $N_2=-2\times10^{-5}$. Distortion is corrected to a level allowable for practical use and can further be corrected electrically if necessary.

This lens system has performance which is sufficient for use as a lens system for video cameras. Though it is necessary to use a material which has a larger value of Δn for obtaining a wider field angle, it is difficult to manufacture such a material. It is therefore difficult to obtain a field angle which is larger than the value described above.

In order to widen the field angle of the lens system using a material which can easily be manufactured, a radial type gradient index lens element which has a negative refractive power and two planar surfaces is disposed on the object side of the radial type gradient index lens element made of the material GP. By selecting such a composition, it is possible to obtain the so called retrofocus type power distribution, thereby widening the field angle. In this case, it is desirable to impart most of a power required for a lens system not to surfaces of the gradient index lens elements but to a medium thereof because aberrations produced by the medium can be made smaller than aberrations produced by the surfaces. It is therefore desirable to impart a negative power to the medium of a negative lens element and a positive power to a medium of the positive lens element.

In this case, aberrations can be corrected on a principle similar to that shown in Table 2 above. For correction of astigmatism in particular, it is sufficient to determine a thickness of the negative lens element and that of the positive lens element dependently on specifications for the lens system such as a focal length and a back focal length so that astigmatism is corrected favorably in the lens system as a whole. For this purpose, it is desirable to dispose a stop between the two lens elements.

For the reason described above, the optical system according to the present invention adopts the composition which has been described above. In order to favorably correct both longitudinal chromatic aberration and lateral chromatic aberration to levels sufficient for practical use, it is desirable to allow the media to produce chromatic aberration in an amount as small as possible, and the optical system according to the present invention is therefore configured to satisfy the conditions (1) and (2).

If a range defined by the condition (1) or (2) is exceeded, correction of longitudinal chromatic aberration will hardly be compatible with correction of lateral chromatic aberration, whereby either or both will be too remarkable.

Accordingly, the optical system according to the present invention which has the first composition is composed as described above. Speaking concretely, the optical system is composed, in order from the object side, of the radial type gradient index lens element which has a negative refractive power of medium and a negative refractive power as a whole, and the radial type gradient index lens element which has a positive power of medium and a positive refractive power as a whole, and configured so as to satisfy the conditions (1) and (2).

In order to correct astigmatism favorably in the optical system according to the present invention which has the first composition described above as a whole, it is desirable to configure the radial type gradient index lens element which has the positive refractive power so as to have a center thickness on the order of ¼ pitch or satisfy the following condition (3):

(3) $0.15 < d(p)/p < 0.40$ wherein the reference symbol d(p) represents a center thickness of the radial type gradient index lens element which has the positive refractive power and the reference symbol p designates a pitch of a material of the radial type gradient index lens element which is given by the following formula (e):

$$p = 2\pi\{N_0/-2N_1\}^{1/2} \quad (e)$$

If the upper limit or the lower limit of the condition (3) mentioned above is exceeded, astigmatism will be remarkable.

From a viewpoint of ease of in manufacturing of a material, it is desirable that the radial type gradient index lens element has a maximum refractive index difference Δn which satisfies the following condition (4):

(4) $|\Delta n| < 0.1$

If Δn exceeds a range defined by the condition (4), it will be difficult to manufacture a material.

Now, description will be made of the optical system according to the present invention which has the second composition.

Since an ordinary lens system is generally composed of three to six lens elements, its performance is apt to be degraded due to eccentric ties produced at a working stage and an assembling stage.

In order to avoid this problem it is necessary to impart a power as weak as possible to each lens surface, thereby reducing an influence due to shift or tilt of the lens surface produced by an eccentricity of a lens element.

A power φ of a lens surface is given by the following formula (f):

$$\phi = (n'-n)C \quad (f)$$

wherein the reference symbol n represents a refractive index of the surface before refraction, the reference symbol n' designates a refractive index of the surface after refraction and the reference symbol C denotes a curvature of the surface.

From the formula (f) mentioned above, it is sufficient for weakening a power of each lens surface to reduce (n'−n) or C. In order to reduce (n'−n), it is effective to configure a lens system as a cemented lens component, or form no air layer before and after a lens surface. This is proven, for example, by a fact that an achromatic lens system composed of a positive lens element and a negative lens element which are cemented to each other is lens affected by an eccentricity than an achromatic lens system composed of a positive lens element and a negative lens element which are disposed with an airspace reserved therebetween.

In order to reduce curvature C, it is effective to use a radial type gradient index lens elements and impart a power to a medium thereof so that the lens elements have planar surfaces.

It is therefore effective also for the optical system according to the present invention to configure the radial type gradient index lens elements so as to have planar surfaces.

Out of the method to reduce (n'−n) and the method to reduce a value of C descried above, it is preferable to adopt the former method which uses a cemented lens component or forms no air layer before or after a lens surface to reduce (n'−n), and this method is effective also for radial type gradient index lens elements. In this case, it is desirable not only to cement the lens elements but also to interpose no air layer between the lens elements and an image pickup device. A method which is effective for this purpose is to configure a lens system so as to have a planar final surface, compose an optical system so as to have an image surface in the vicinity of the final surface, and cement the planar final surface to an image pickup surface of the image pickup device. Another method is to fill a resin between the final surface of the lens system and the image pickup surface of the image pickup device. This method is applicable not only to a planar final surface but also to a curved final surface.

Though an image pickup optical system which uses an image pickup device has been described above, the optical system according to the present invention may be combined with a display device in place of the image pickup device to compose a display optical system which is applicable to a view finder or an image observation optical system.

For the reason described above, the optical system according to the present invention which has the second composition is characterized in that it is composed of a lens system consisting of a plurality of lens elements and an image pickup device or a display device, and that the lens elements are brought into close contact with one another and the final surface of the lens system is brought into close contact with the image pickup device or the display device or airspaces between these members are filled with a resin so that no air layer exists in the optical system.

Now, description will be made of the optical module according to the present invention which has the third composition.

When two optical systems are necessary for stereoscopic photography or automatic focusing, the two optical systems must be aligned accurately. This alignment requires tedious procedures and constitute a case for enhancement in a manufacturing cost.

An optical system for stereoscopic photography or phase detection automatic focusing will be described below:

For a conventional optical system which electrically performs stereoscopic photography or phase detection automatic focusing, it is general to compose two optical systems by attaching two separate lens systems to separate image pickup devices and adequately align these two optical systems. It is therefore necessary to align the two optical systems.

In the optical module according to the present invention which has the third composition, two photographing areas are located on one planer surface of one device, substrate two lens systems are configured so as to have planar final surfaces and image surfaces in the vicinities of the final surfaces, and the final surfaces of the two lens systems are cemented directly to the two photographing areas. Accordingly, optical axes of the two optical systems can easily be set in parallel with each other, thereby facilitating alignment of the two optical systems.

The device substrate is a planar wafer made of silicon or the like which has electric circuit patterns formed on a surface thereof and a function to pickup an image or a function to emit and receive light.

As an optical system to be used in the optical module which has the third composition, it is effective to use an optical system which is composed so as to comprise no air layer. The optical system comprising no air layer is composed of lens elements which are integrated by cementing and can be cemented to the substrate for device without a lens barrel.

In order to obtain a lens system which has a composition as simple as possible, a field angle on the order of 50° and performance sufficient for practical use, the optical system according to the present invention which has the fourth composition is composed of a single homogeneous lens element which has an image side planar surface so that the lens system can easily be assembled in an image and is configured to form an image in the vicinity of this planar surface.

Since the lens element has a simple composition and has a planar surface, it can be manufactured at a low cost. The lens system which is composed of the single lens element can easily be assembled, has performance less degraded due to an eccentricity of the lens element, is compatible with a lens barrel having a simple structure and can be manufactured at a low cost.

It is desirable to configured this lens system so as to satisfy the following condition (6):

(6) −0.5 mm<δ<2.0 mm wherein the reference symbol δ represents a deviation distance as measured from the image side surface to an image surface of the lens element in a direction along an optical axis.

By configuring the lens element so as to satisfy the condition (6) mentioned above, it is possible to prevent an image being degraded remarkable in its quality due to defocusing when an image pickup device is used in a condition kept in close contact with the image side surface of the lens element. If a range defined by the condition (6) is exceeded, an image will undesirably be degraded in its quality. The upper limit of the condition (6) defines a deviation distance longer than that defined by the lower limit thereof, i.e., the upper limit which is on the positive side of a focused point at which δ has an absolute value which is larger than that of the lower limit which is on the negative side of the focused point since defocusing at a certain degree can be corrected by a thickness of a layer of a bonding agent or a resin between an image pickup surface and the lens element when the image surface is deviated rearward from the image side surface of the lens element, or on the positive side.

An image surface and a focal length of the lens system which has the fourth composition are determined nearly by a radius of curvature on a first surface and a thickness of the lens element. Accordingly, freedom for correction of aberrations is dependent only on a location of an aperture stop.

Correction of astigmatism, distortion and lateral chromatic aberration is important for lens systems which have field angles within a range from a wide field angle of approximately 50° to he standard field angle.

In the lens system according to the present invention which has the fourth composition, an aperture stop is disposed at a location which satisfies the above-mentioned condition (5).

If the upper limit of the lower limit of the condition (5) is exceeded, astigmatism, distortion and lateral chromatic aberration will be aggravated, thereby undesirably degrading imaging performance remarkably due to the aggravation of astigmatism in particular.

Further, for favorable correction of spherical aberration in particular, it is preferable to configure an object side surface of the lens system according to the present invention which has the fourth composition as an aspherical surface having a refractive power weakened from an optical axis toward a marginal portion thereof.

Figure 18:
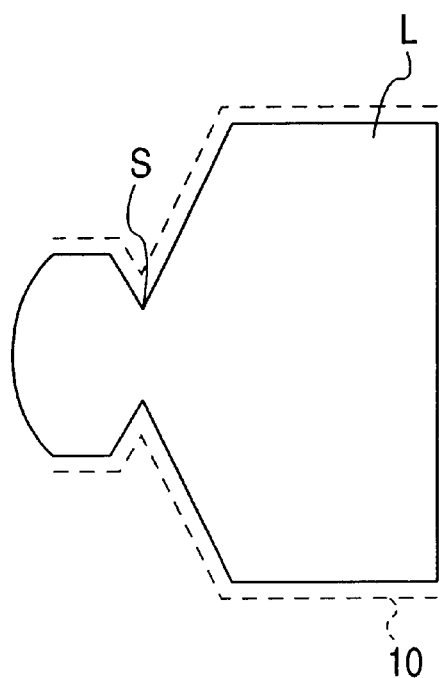
FIG. 18 shows a sectional view illustrating a lens element which has a stop disposed therein.

When an aperture stop is to be located in the lens element, it is sufficient to configure the lens element so as to have such a sectional shape as that shown in FIG. 18 and dispose the aperture stop at a location indicated by a reference symbol S. That is to say, it is sufficient to form a groove like waist portion in an outer circumference of the lens element and apply a light shielding black paint 10 to the outer circumference of the lens element. This paint exhibits an effect which is similar to that of a stop disposed in the lens element. By applying a black paint as described above, it is possible to form an aperture stop conveniently without increasing a number of parts.

Figure 3:
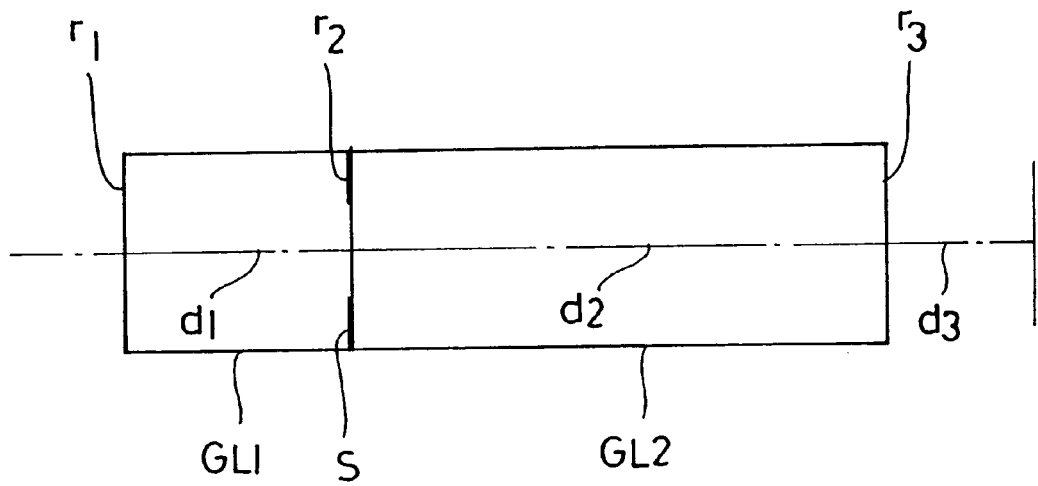
FIGS. 3 through 8 show sectional views illustrating compositions of first through sixth embodiments of the optical system according to the present invention.

FIG. 3 shows a sectional view illustrating a first embodiment of the optical system according to the present invention having the first composition, which is a lens system composed, in order from the object side, of a radial type gradient index lens element (GL1) which has a negative refractive power of medium, a negative refractive power as a whole and two planar surfaces, a radial type gradient index lens element (GL2 which has a positive refractive power of medium, a positive refractive power as a whole and two planar surfaces, and a stop which is disposed on a cemented surface. That is, the first embodiment has a composition wherein a stop S is disposed between the two gradient index lens element GL1 and GL2. The optical system preferred at the first embodiment has numerical data which is listed below:

| Embodiment 1 |
| --- |
| f = 4.8 mm, F/2.8, IH = 2.0 mm, 2ω = 50.1° |

| $r_1 = \infty$ | | |
| --- | --- | --- |
| | $d_1 = 5.6713$ | (gradient index lens element GL1) |
| $r_2 = \infty$ (stop) | | |
| | $d_2 = 13.5744$ | (gradient index lens element GL2) |
| $r_3 = \infty$ | | |
| | $d_3 = 3.6980$ | (back focal length) |
| $\|1/V_{1n}\| = 0.002$, $\|1/V_{1p}\| = 0.002$, $d(p)/p = 0.23$ | | |

The radial type gradient index lens element GL1 of this embodiment is made of a material GN which has numerical data listed in Table 3 shown below and the radial type gradient index lens element GL2 which has the numerical data listed in Table 1.

TABLE 3

| $N_0 = 1.66000$, | $N_1 = 1.000 \times 10^{-2}$, | $N_2 = 0$ |
| --- | --- | --- |
| $V_0 = 37.89$, | $V_1 (V_{1n}) = 500.0$ | |
| $P_0 = 0.295$, | $P_1 = 0.295$ | |
| effective diameter = 4 mm, | $\Delta n = 0.04$ | |

This optical system has a field angle 2ω of 50.1° which is much wider than 38.7° of the optical system which is composed of the radial type gradient index lens element having the positive power described above. Further, it is possible to obtain an optical system which has an optical field angle within a range from 38.7° to 50.1° by adequately setting thicknesses of the two lens elements.

Figure 4:
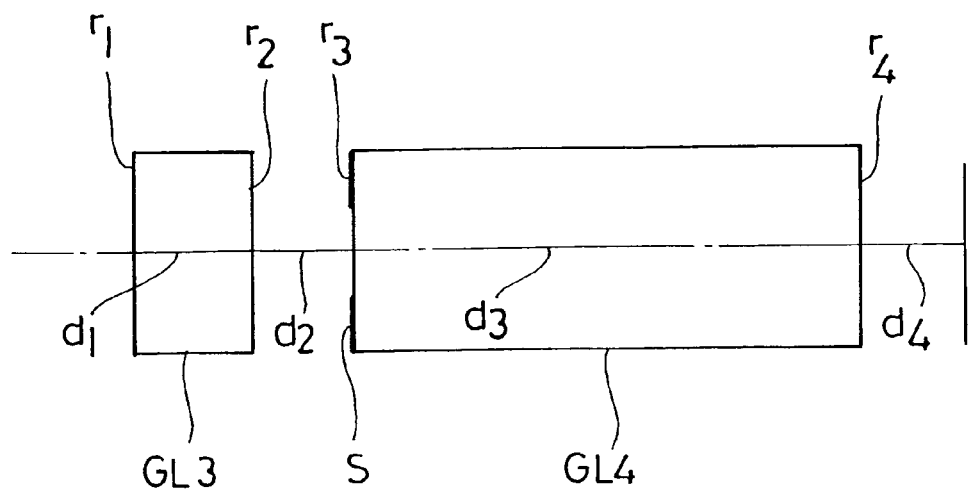

A second embodiment of the optical system according to the present invention having the first composition is composed, in order from the object side, of a radial type gradient index lens element (GL3) which has a negative refractive power of medium, a negative refractive power as a whole and two planar surfaces, and a radial type gradient index lens element (GL4) which has a positive refractive power of medium, a positive refractive power as a whole, and two planar surfaces as shown in FIG. 4: the radial type gradient index lens elements being disposed apart from each other. The second embodiment has numerical data which is listed below:

| Embodiment 2 |
| --- |
| f = 4.8 mm, F/2.8, IH = 2.0 mm, 2ω = 50.0° |

| $r_1 = \infty$ | | |
| --- | --- | --- |
| | $d_1 = 3.0000$ | (gradient index lens element GL3) |
| $r_2 = \infty$ | | |
| | $d_2 = 2.5249$ | |
| $r_3 = \infty$ (stop) | | |
| | $d_3 = 12.8180$ | (gradient index lens element GL4) |
| $r_4 = \infty$ | | |
| | $d_4 = 2.6061$ | (back focal length) |
| $\|1/V_{1n}\| = 0.002$, $\|1/V_{1p}\| = 0.002$, $d(p)/p = 0.22$ | | |

The gradient index lens element GL3 of the second embodiment is made of the medium GN which has the numerical data listed in table 3 and the gradient index lens element GL4 is made of the material GP which has the numerical data listed in Table 1.

A third embodiment of the optical system according to the present invention having the first composition is an optical system composed, in order from the object side, of a radial type gradient index lens element (GL5) which has a negative refractive power of medium, a negative refractive power as a whole and a concavo-planar shape, and a radial type gradient index lens element (GL6) which has a positive refractive power of medium, a positive refractive power as a whole and a plano-convex shape: the radial type gradient index lens elements being cemented to each other and a stop S being disposed on a cemented surface. This optical system has numerical data which is listed below:

| Embodiment 3 |
| --- |
| f = 4.8 mm, F/2.8, IH = 2.0 mm, 2ω = 49.0° |

| $r_1 = -12.000$ | | |
| --- | --- | --- |
| | $d_1 = 0.8544$ | (gradient index lens element GL5) |
| $r_2 = \infty$ (stop) | | |
| | $d_2 = 12.9411$ | (gradient index lens element GL6) |
| $r_3 = -12.000$ | | |
| | $d_3 = 2.6820$ | (back focal length) |
| $\|1/V_{1n}\| = 0.002$, $\|1/V_{1p}\| = 0.002$, $d(p)/p = 0.22$ | | |

The gradient index lens element GL5 of the third embodiment is made of the material GN which has the numerical data listed in Table 3 and the gradient index lens element GL6 is made of the material GP which has the numerical data listed in Table 1.

Figure 6:
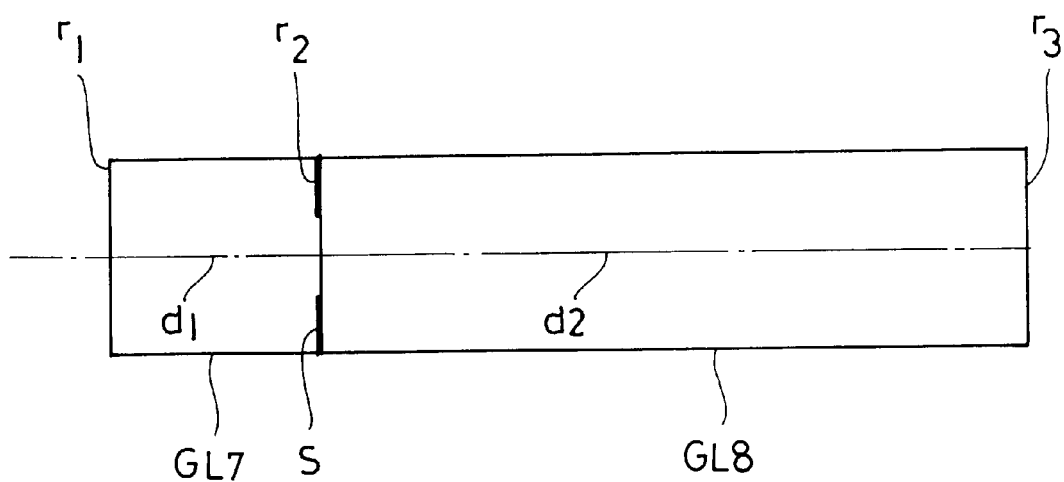

FIG. 6 shows an optical system preferred as a fourth embodiment of the optical system according to the present invention which has the first or second composition. The fourth embodiment is a lens system is composed, in order from the object side, of a radial type gradient index lens element (GL7) which has a negative refractive power of medium, a negative refractive power as a whole and two planar surfaces, and a radial type gradient index lens element (GL8) which has a positive refractive power of medium, a positive refractive power as a whole and two planar surfaces: the gradient index lens elements being cemented to each other and a stop S being disposed on a cemented surface. This optical system is configured to form an object located at infinite distance in the vicinity of a final surface of the lens system. In other words, the lens system has a final surface which is planar since the radial type gradient index lens element GL8 has the two planar surfaces and the lens system is configured to form an image in the vicinity of the final planar surface.

The fourth embodiment has numerical data which is listed below:

Embodiment 4
f = 4.0 mm, F/2.8, IH = 2.0 mm, 2ω = 61.9°

$r_1 = \infty$
$\quad d_1 = 5.5779$ (gradient index lens element GL7)
$r_2 = \infty$ (stop)
$\quad d_2 = 19.0416$ (gradient index lens element GL8)
$r_3 = \infty$
$|1/V_{1n}| = 0.002, |1/V_{1p}| = 0.002, d(p)/p = 0.33$ The gradient index lens element GL7 of the fourth embodiment is made of the material GN having the numerical data listed in Table 3 and the radial type gradient index lens element GL8 is made of the material GP having the numerical date listed in Table 1.

Figure 7:
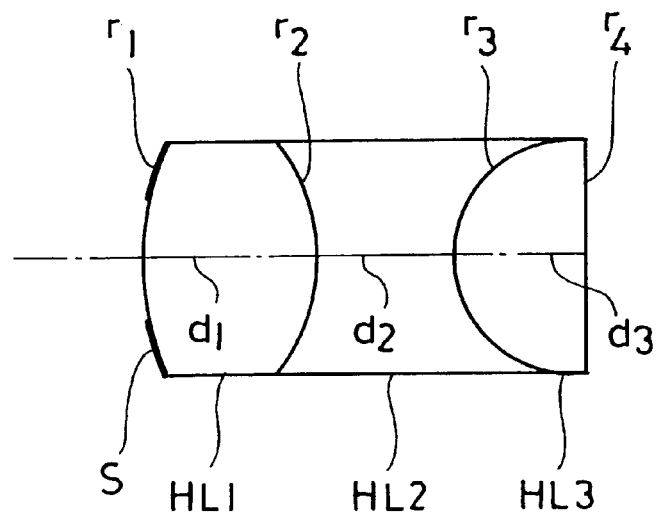

FIG. 7 shows a composition of a fifth embodiment of the optical system according to the present invention which has the second composition. The fifth embodiment is an image pickup lens system which is composed of three homogeneous lens elements, in order from the object side, a positive biconvex lens element (HL1), a negative biconcave lens element (HL2), and a positive convexo-planar lens element (HL3) which has a convex object side surface and a planar image side surface: the lens elements being integrated with one another by cementing and a stop being disposed on a first surface.

The lens system preferred as the fifth embodiment is configured to form a best image of an object located at a distance of 280 mm on the final (planar) surface of the lens system.

The fifth embodiment has numerical data which is listed below:

Embodiment 5
f = 4.5 mm, F/1.8, IH = 1.8 mm, 2ω = 47.6°

Figure 8:
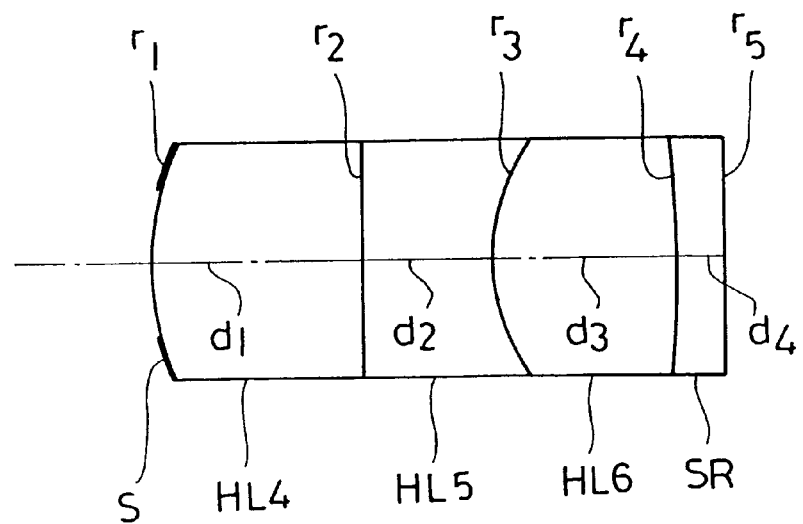

$r_1 = 5.3757$ (stop)
$\quad d_1 = 3.7197 \quad n_1 = 1.81600 \quad v_1 = 46.62$
$r_2 = -3.9287$
$\quad d_2 = 2.8910 \quad n_2 = 1.59270 \quad v_2 = 35.30$
$r_3 = 2.4461$
$\quad d_3 = 2.7989 \quad n_3 = 1.81600 \quad v_3 = 46.62$
$r_4 = \infty$ A sixth embodiment is a lens system which also has the second composition of the optical system according to the present invention, or is composed as shown in FIG. 8.

The lens system preferred as the sixth embodiment is an image pickup lens system composed of three homogeneous lens elements, in order from the object side, a positive convexo-planar lens element (GL4) which has a convex object side surface and a planar image side surface, a negative plano-concave lens element which has a concave image side surface and a positive biconvex lens element (HL6): these lens elements being integrated with one another by cementing and a stop S being disposed on the object side surface of the first lens element HL4. A resin (SR) is filled on the image side of this lens system.

The sixth embodiment is configured to form a best image of an object located at a distance of 550 mm in the resin which is located 1.0 mm after a final surface. An end surface of this resin SR becomes an image surface when the resin SR has a thickness of 1.0 mm.

The sixth embodiment has numerical data which is listed below:

Embodiment 6
f = 6 mm, F/2.0, IH = 1.8 mm, 2ω = 35.0°

$r_1 = 6.4067$ (stop)
$\quad d_1 = 4.5095 \quad n_1 = 1.81600 \quad v_1 = 46.62$
$r_2 = \infty$
$\quad d_2 = 2.7438 \quad n_2 = 1.53172 \quad v_2 = 48.91$
$r_3 = 4.2264$
$\quad d_3 = 3.9189 \quad n_3 = 1.88300 \quad v_3 = 40.78$
$r_4 = -30.4102$
$\quad d_4 = 1.0000 \quad n_4 = 1.49216 \quad v_4 = 57.50$
$r_5 = \infty$ The reference symbols $n_4$ and $n_4$ in the numerical data represent a refractive index and an Abbe's number respectively of the resin SR.

Figure 9A:
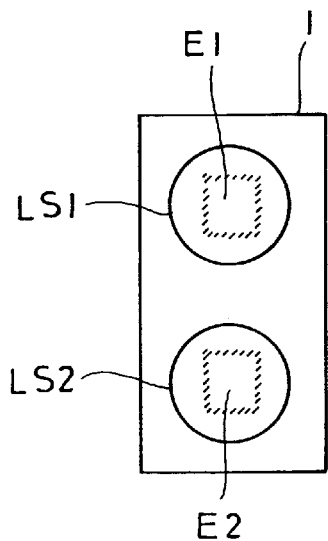
FIGS. 9A and 9B show diagrams illustrating an example of the optical module according to the present invention.
Figure 9B:
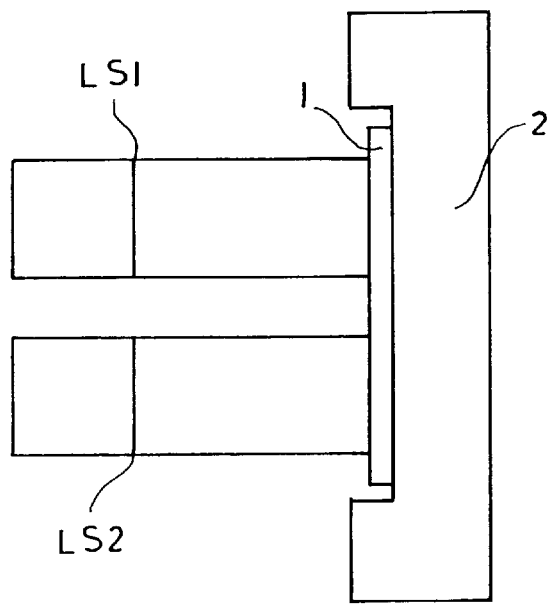

FIGS. 9A and 9B show an image pickup module for picking up a stereoscopic image which is preferred as an embodiment of the optical module according to the present invention which has the third composition.

Figure 5:
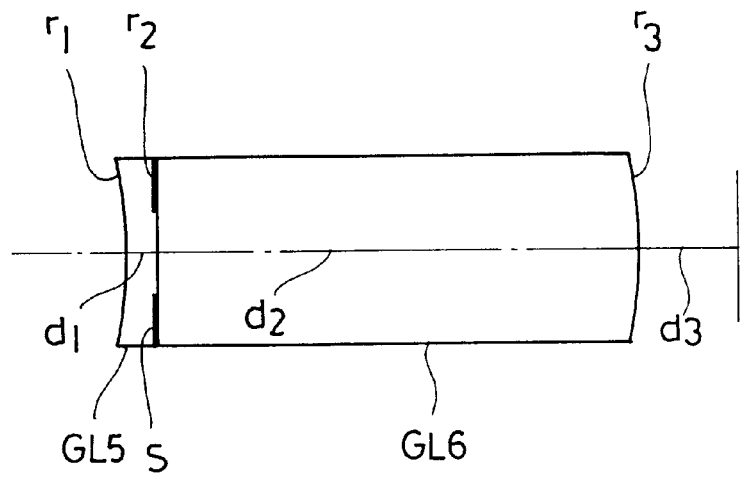

The embodiment has a composition wherein two lens systems (lens system LS1 and LS2) are bonded to a substrate 1 for image pickup device which has two image pickup areas E1 and E2 as shown in FIGS. 9A and 9B. The substrate for image pickup device is attached to a ceramic substrate 2. The two lens systems LS1 and LS2 used in the image pickup module are the lens systems preferred as the fourth embodiment and have planar final surfaces in the vicinities of which image surfaces are located. FIG. 5A is a plan view, whereas FIG. 9B is a side view.

Figure 10A:
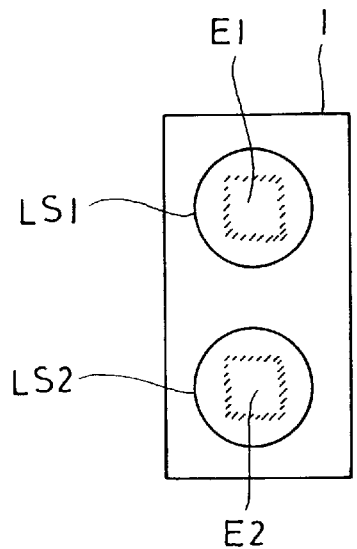
FIGS. 10A and 10B show diagrams illustrating another example of the optical module according to the present invention.
Figure 10B:
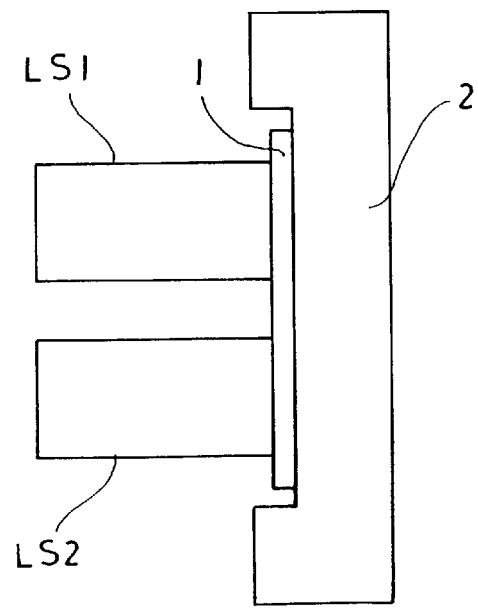

FIGS. 10A and 10B show an optical module for performing passive automatic focusing by the phase detection method which is preferred as an embodiment of the optical module according to the present invention which has the third composition. This embodiment has a composition wherein two lens systems SL1 and SL2 are bonded to a substrate 1 for image pickup device which has two image pickup areas E1 and E2. The substrate 1 for image pickup device is attached to a ceramic substrate 2. Out of these drawings, FIG. 10A is a plan view, whereas FIG. 10B is a side view.

The lens systems LS1 and LS2 used in this embodiment have a composition illustrated in FIG. 17 and numerical data which is listed below:

Embodiment 7
f = 6.248 mm, F/2.6, IH = 1.4 mm, 2ω = 25.8°

$r_1 = \infty$ (stop)
        $d_1$ = 16.4658   (gradient index lens element GL9)
$r_2 = \infty$
gradient index lens element GL9
$N_0$ = 1.6778,    $N_1$ = −7.6346 × 10⁻³,   $N_2$ = 0
$V_0$ = 35.19,     $V_1$ = 185.5,            $P_0$ = 0.292,   $P_1$ = 0.292
defective          Δn = 0.015
diameter = 2.8 mm, The lens system (preferred as the seventh embodiment) is composed of a single radial type gradient index lens element (GL9) which has a positive refractive power and is made of a material having numerical data listed above.

The seventh embodiment has a planar final surface and forms an image in the vicinity of an image pickup surface. Further, a layer of a bonding agent on the order of scores of microns exists between the final surface of the lens system and the image pickup areas since an epoxy bonding agent is filled between the lens system and the image pickup area so as to be in close contact and bond with and to the lens system and the image pickup area.

Though images which are picked up by the lens systems SL1 and SL2 are deviated from each other for a distance equal to a spacing between the two lens systems (a base length) and slightly different from each other, this deviation serves for obtaining signals for automatic focusing.

By adopting such a composition as that exemplified by this embodiment, it is possible to obtain a merit to facilitate to set optical axes of the two lens systems in parallel with each other, thereby eliminating the necessity of special alignment.

Figure 12A:
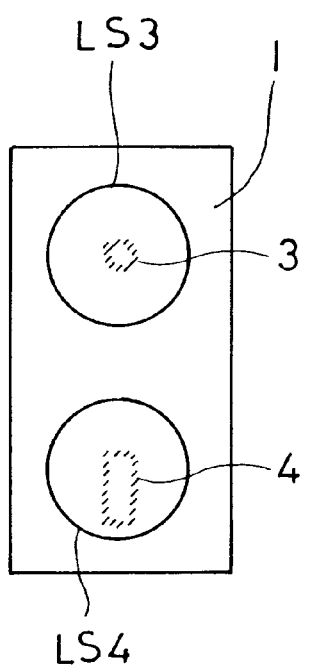
FIGS. 12A and 12B show diagrams illustrating still another example of the optical module according to the present invention.
Figure 12B:
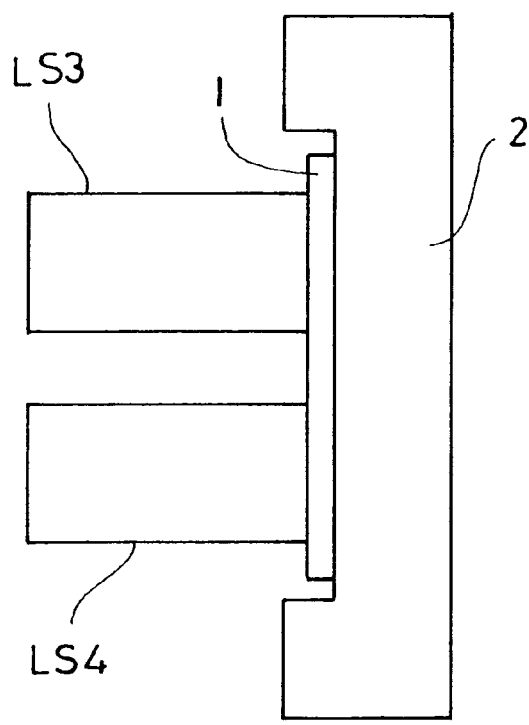

An embodiment shown in FIGS. 12A and 12B is another example of the optical module according to the present invention which has the third composition which is configured as an optical module for carrying out infrared ray active type automatic focusing.

Figure 11:
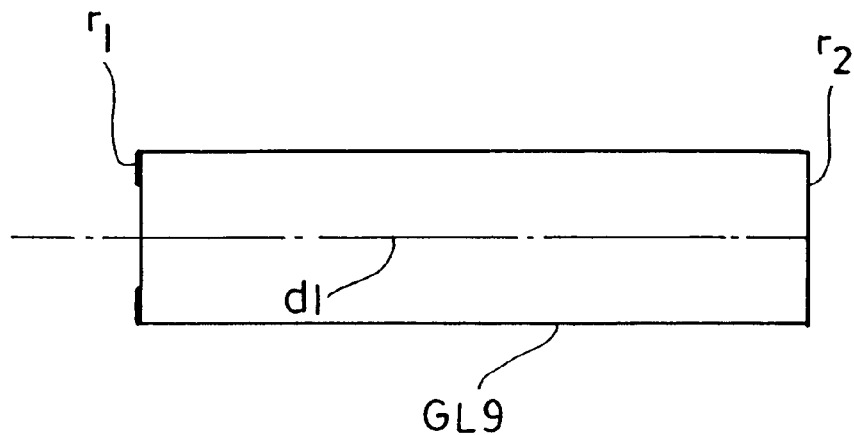
FIG. 11 shows a sectional view illustrating a composition of a seventh embodiment of the optical system according to the present invention.

Out of FIGS. 12A and 12B, FIG. 12A is a plan view and FIG. 12B is a side view. This embodiment has a composition wherein two lens systems LS3 and LS4 are bonded to a substrate for device which has a light emitting section 3 and a light receiving section 4 as shown in FIG. 12A. The lens systems used in this embodiment have numerical data which is the sane as that of the lens system shown in FIG. 11, and are configured so as to have planar final surfaces and form images in the vicinities of the final surfaces. Also in this embodiment, a layer which is actually scores of microns thick is formed between the lens system and image pickup area by filling an epoxy bonding agent.

This embodiment is configured so that infrared rays emitted from the light emitting section are condensed by the lens system LS3 and projected to a target object, and infrared rays reflected and scattered by the target object return to the light receiving section, whereby the optical module detects a location of a spot of the rays returned to the light receiving section and measures an object distance dependently on the detected location.

This embodiment also facilitates to set optical axes of the two lens systems LS3 and LS4 in parallel with each other, thereby requiring no special alignment.

The lens systems shown in the fourth, fifth, sixth and seventh embodiments (FIGS. 6, 7, 8, 9A and 9B) can be used as ordinary image pickup optical systems when image pickup devices such as CCDs are disposed on image sur-faces thereof. Further, these lens systems are usable as display optical systems when display devices such as LCDs are disposed on the image surfaces of the lens systems.

Figure 13:
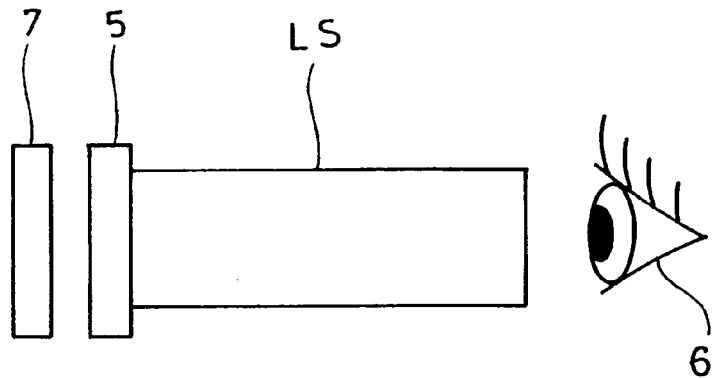
FIG. 13 shows a diagram illustrating an example wherein the optical system according to the present invention is used as a display optical system.

FIG. 13 shows an example of how the lens system described above is used as a display optical system wherein a display device 5 is kept in close contact with a lens system LS with no air layer interposed. Since rays from the display device 5 are made nearly in parallel with one another by the lens system LS, a magnified image of a display pattern can be observed when an eye is located close to the lens system. A reference numeral 7 represents a back light.

Figure 14A:
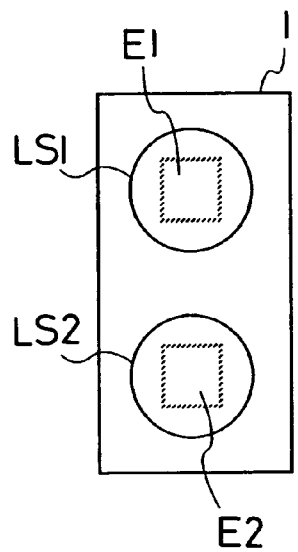
FIGS. 14A and 14B show diagrams illustrating another example of the optical module according to the present invention.
Figure 14B:
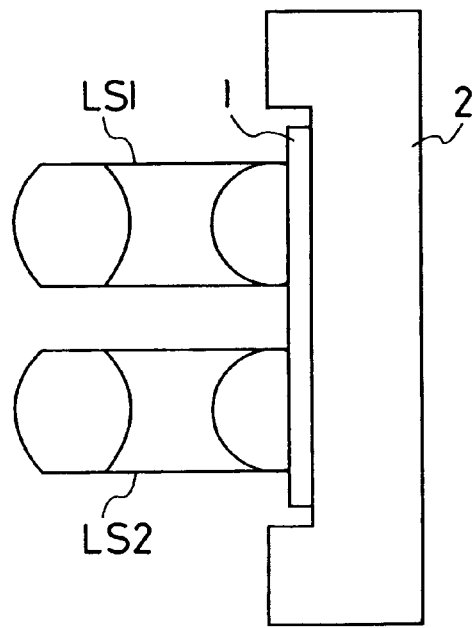

FIGS. 14A and 14B show an optical module in which a pair of lens systems preferred as the fifth embodiment of the present invention are cemented to a substrate for device for carrying out automatic focusing, for example.

Now, description will be made of an active triangulating range finding type optical system using the optical nodule according to the present invention.

Figure 15:
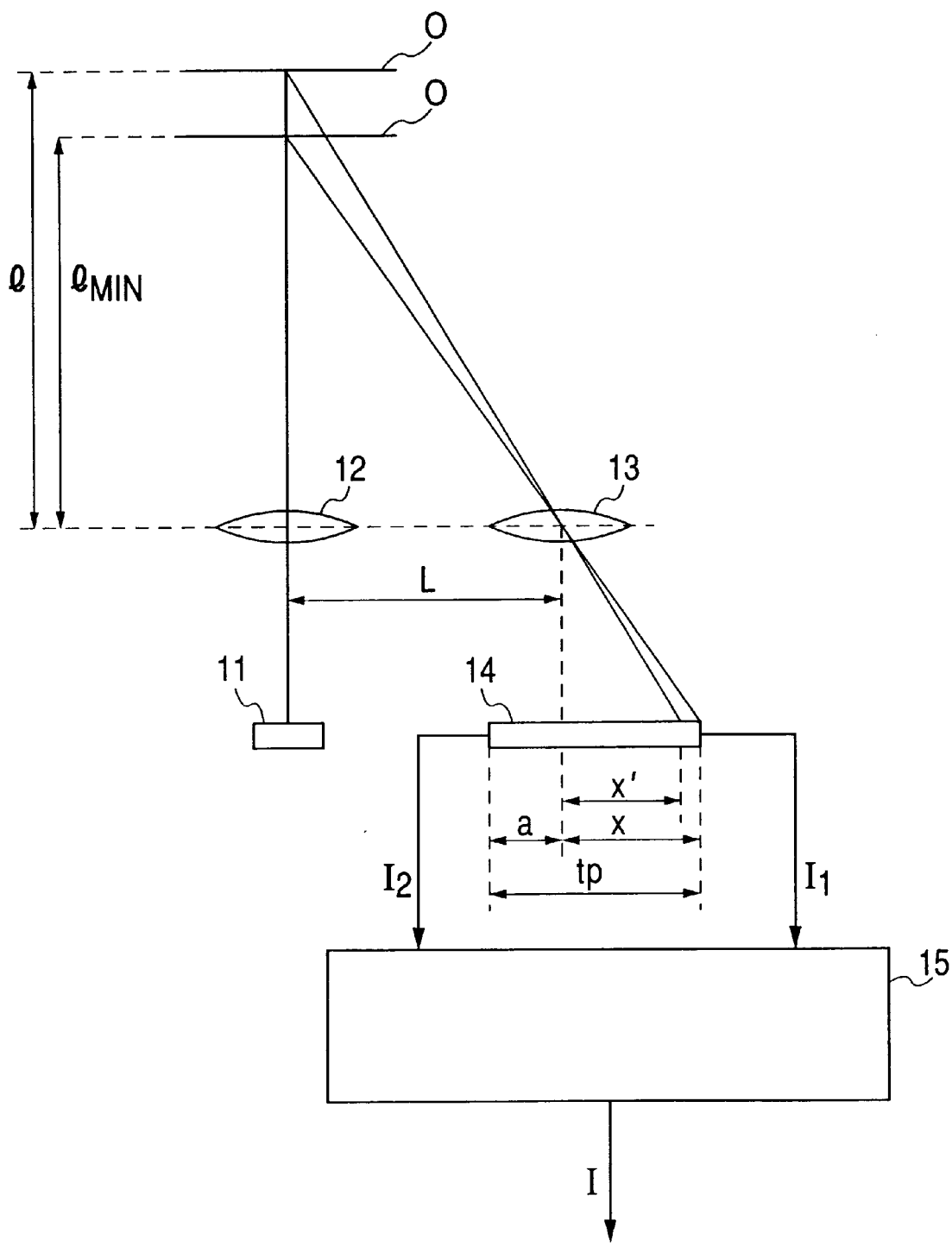
FIG. 15 shows a diagram illustrating an active triangulational range finder type optical system.

FIG. 15 shows a configuration of an active triangulating type range finding optical system.

In FIG. 15, a reference numeral 11 represents an infrared light emitting diode (IRED) used as a light emitting section which intermittently emits infrared rays, a reference numeral 12 designates a projector lens which leads the infrared rays emitted from the infrared light emitting diode 11 to an object O, a reference numeral 13 denotes a receiver lens which condenses infrared rays reflected by the object O, and a reference numeral 14 represents a semiconductor optical position sensor diode (PSD) used as a light receiving section which receives the infrared rays condensed by the receiver lens and outputs two kinds of currents (electric signals $I_1$ and $I_2$) corresponding to a light receiving position. Though each of the projector lens 12 and the receiver lens 13 is shown as a single biconvex lens element, it is actually the optical module shown in FIG. 12A.

When the infrared light emitting diode 11 is employed in the range finding optical system configured as described above, a portion of rays emitted from the infrared light emitting diode is projected through the projector lens 12 to the object O, and a portion of the rays projected to the object O is reflected by the object O and image by the receiver lens 13 on a surface of the light position detecting element 14.

When the imaging location on the surface of the light detecting element 14 is represented by x, a distance between principal points of the projector lens 12 and the receiver lens 13 (base length) is designated by L, a focal length of the receiver lens 13 is denoted by $f_{13}$, and a distance to the object is represented by l, we obtain the following equation (g):

$$x = L \cdot f_{13} / l \qquad (g)$$

As shown in FIG. 15, a start point of the imaging location x lies at a point at which a straight line which is in parallel with a straight line which passes the principal point of the receiver lens 13 and connects a light emitting center of the infrared light emitting diode 13 to the principal point of the projector lens 12 intersects with the light position detecting element 14.

Further, out of the two kinds of currents $I_1$ and $I_2$ output from the light position detecting element 14, current components which are produced by infrared rays which have been emitted from the infrared light emitting diode 11, reflected by the object O and reached the light position detecting element 14, i.e., signals $I_1$ and $I_2$ from which current components produced by sunlight and illumination light are eliminated, can be expressed as functions of the imaging location x by the following equations (h) and (i) respectively:

$$I_1 = \{(a+x)/tp\} \cdot Ip\phi \quad \text{(h)}$$

$$I_2 = \{tp-(a+x)/tp\} \cdot Ip\phi \quad \text{(i)}$$

wherein the reference symbol $Ip\phi$ represents a total signal photoelectric current, the reference symbol tp designates a total length of the light position detecting element 14, the reference symbol a denotes a distance as measured from the start point of the imaging location x to an end of the light position detecting element located on a side of the infrared light emitting diode 11.

Form the equations (g), (h) and (i) mentioned above, we obtain the following equation (k):

$$1/l = [tp \cdot \{I_1(I_1+I_2)\} - a]/(L \cdot f_{13}) \quad \text{(k)}$$

The signals $I_1$ and $I_2$ output from the light position detecting element 14 are sent into a judgement circuit 15 shown in FIG. 15, which computes a range finding signal I by calculating a distance to the object O from the signal currents $I_1$ and $I_2$ by the equation (k).

The equation (k) is valid even when the infrared light emitting diode 11 is not located on an optical axis of the projector lens 2.

Figure 16:
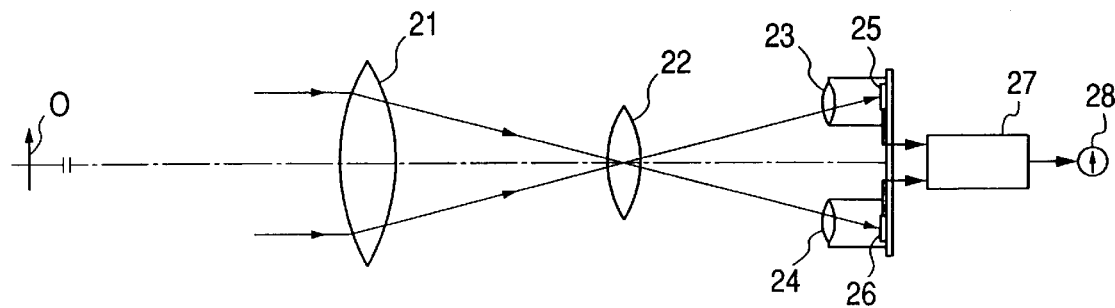
FIGS. 16 and 17 show diagrams exemplifying a focus detection device.
Figure 17:
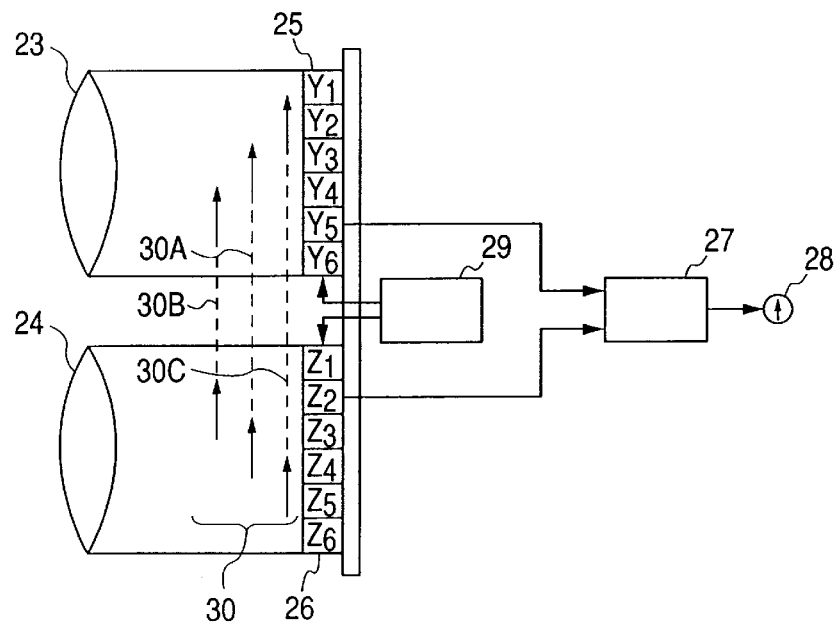

FIGS. 16 and 17 show an example wherein the optical module according to the present invention is used in a focused point detecting apparatus utilizing rays which have passed through a photographic lens system of a camera.

In FIG. 16, a reference numeral 21 represents a photographic lens and a reference numeral 22 designates a condenser lens for imaging an exit pupil of the photographic lens system 21: these lenses being disposed so as to coincide optical axes thereof with each other. Reference numerals 23 and 24 represent relay lenses which are disposed at or in the vicinities of a location at which an image of the exit pupil of the photographic lens is formed by the condenser lens 22, and the reference numerals 25 and 26 designate photoelectric converter means which are disposed at locations at which images of an object are formed by the relay lenses respectively. By comparing signals provided from the photoelectric converter means 25 and 26, it is possible to detect a focused condition of the photographic lens on the object.

In this focused point detecting apparatus, the relay lenses 23 and 24 are integrated with the photoelectric converter means 25 and 26 as shown in FIG. 16.

FIG. 17 shows detector means for the focused point detecting apparatus shown in FIG. 16 and an operating principle of the focused point detecting apparatus will be described on the basis of FIG. 17.

Let us assume that images 30A of an object O are set in conditions indicated by a group of arrows 30 when the photographic lens 21 is focused on the object. By moving the photographic lens 21 forward (closer to the object O), the images on a light receiving surface are set in conditions indicated by arrows 30B. By moving the photographic lens 21 backward (farther from the object O), in contrast, the images on the light receiving surface are set in conditions indicated by arrows 30C. Using image sensors 35 and 36 on which a plurality of minute photoelectric converter elements are arranged as indicated by $Y_1$ through $Y_6$ and $Z_1$ through $Z_6$ shown in FIG. 17, the photoelectric converter elements of the image sensors 35 and 36 are scanned at the same timing in directions from $Y_1$ and $Y_6$ and from $Z_1$ to $Z_6$ respectively with a scanning circuit 9 so that each of the photoelectric converter elements outputs a phase signal which corresponds to brightness of a received image. Since a phase comparator circuit 27 detects a phase advance or phase delay condition when the photographic lens 21 is not focused, it is possible to detect a focused condition or a deviated direction of the photographic lens 21, for example, with a meter 28.

Figure 19:
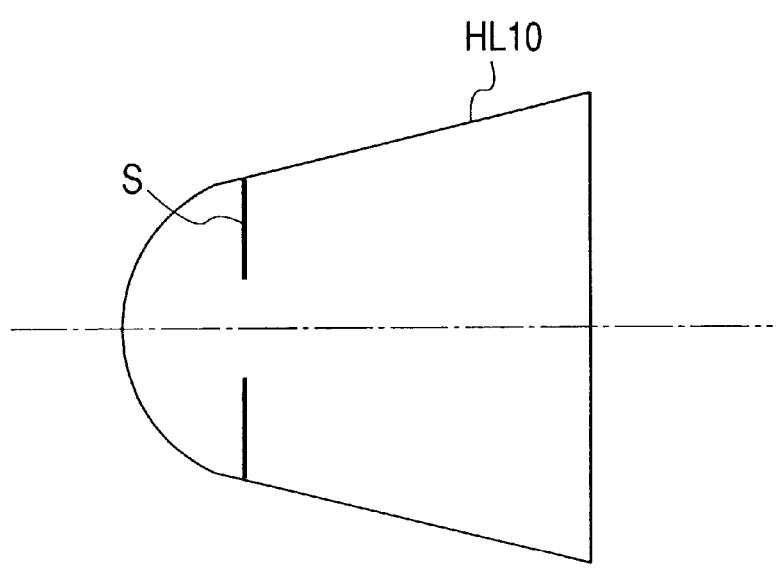
FIGS. 19 through 22 show sectional views illustrating compositions of eighth through eleventh embodiments of the optical system according to the present invention.

The eighth embodiment has a composition illustrated in FIG. 19, or is composed of a convexo-planar lens element HL10 which has a convex spherical surface on the object side. Further, a stop S is disposed in the lens element HL10 and a paraxial imaging point for an object located at infinite distance is disposed on an image side surface of the convexo-planar lens element HL10.

| Embodiment 8 $f = 4.0$ mm, F/2.8, IH = 2.0 mm, $2\omega = 53.8°$ | | | |
|---|---|---|---|
| $r_1 = 1.9696$ | | | |
| | $d_1 = 1.4656$ | $n_1 = 1.49241$ | $v_1 = 57.66$ |
| $r_2 = \infty$ (stop) | | | |
| | $d_2 = 4.5040$ | $n_2 = 1.49241$ | $v_2 = 57.66$ |
| $r_3 = \infty$ | | | |
| ds/f = 0.37 | | | |

Figure 20:
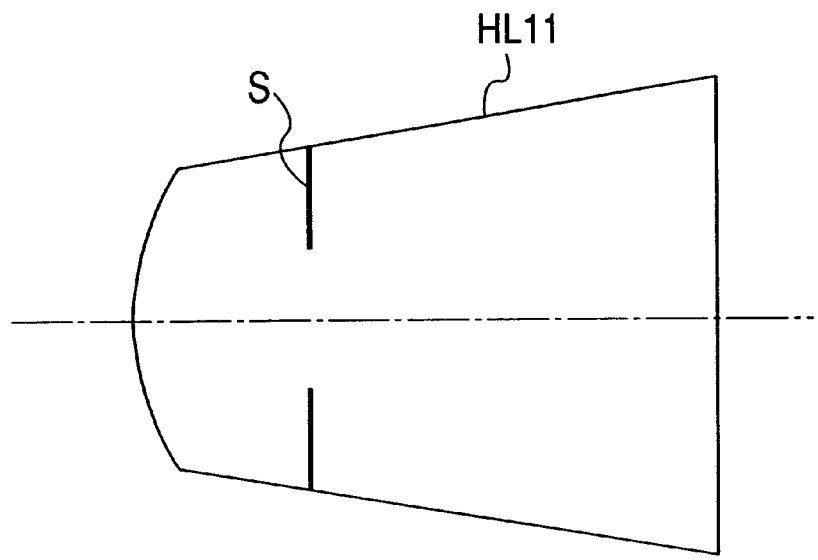

The ninth embodiment has a composition illustrated in FIG. 20, or is composed of a convexo-planar lens element HL11 which has a convex spherical surface on the object side. Further, a stop S is disposed in the lens element. In this embodiment also, a paraxial imaging point for an object located at infinite distance is disposed on an image side surface of the lens element.

| Embodiment 9 $f = 4.0$ mm, F/2.8, IH = 2.0 mm, $2\omega = 54.4°$ | | | |
|---|---|---|---|
| $r_1 = 3.0900$ | | | |
| | $d_1 = 2.0904$ | $n_1 = 1.77250$ | $v_1 = 49.60$ |
| $r_2 = \infty$ (stop) | | | |
| | $d_2 = 4.9996$ | $n_2 = 1.77250$ | $v_2 = 49.60$ |
| $r_3 = \infty$ | | | |
| ds/f = 0.523 | | | |

Figure 21:
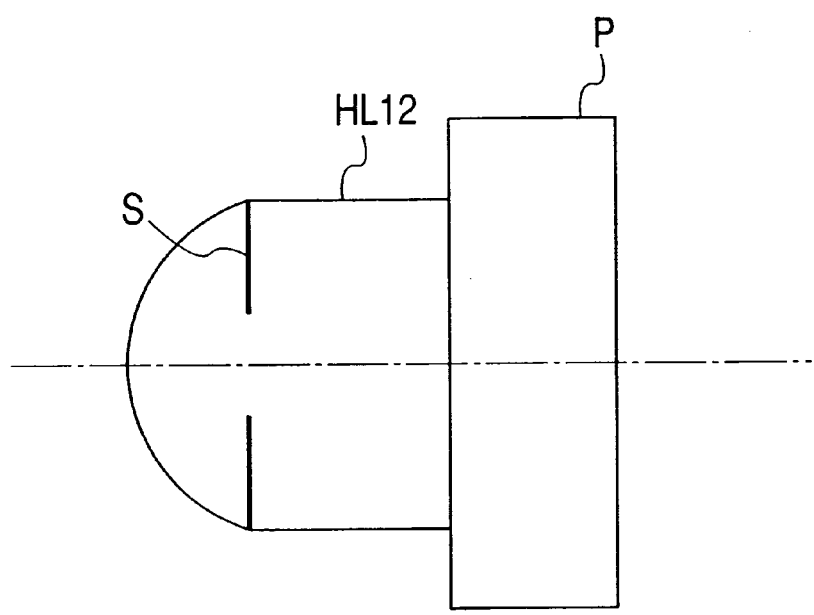

The tenth embodiment is composed, in order from the object side, of a convexo-planar lens element HL12 which has a convex surface on the object side and a planar glass plate P as shown in FIG. 21. In this embodiment, a stop S is disposed in the convexo-planar lens element HL12 and an object side surface of the lens element HL12 is a spherical surface. A paraxial imaging point for an object locates at infinite distance is disposed on an image side surface of the planar glass plate.

The tenth embodiment has numerical data which is listed below:

| Embodiment 10 $f = 4.0$ mm, F/2.8, IH = 2.0 mm, $2\omega = 53.9°$ | | | |
|---|---|---|---|
| $r_1 = 1.9696$ | | | |
| | $d_1 = 1.4227$ | $n_1 = 1.49241$ | $v_1 = 57.66$ |
| $r_2 = \infty$ (stop) | | | |
| | $d_2 = 2.5785$ | $n_2 = 1.49241$ | $v_2 = 57.66$ |
| $r_3 = \infty$ | | | |
| | $d_3 = 2.0000$ | $n_3 = 1.51633$ | $v_3 = 64.14$ |
| $r_4 = \infty$ | | | |
| ds/f = 0.36 | | | |

Figure 22:
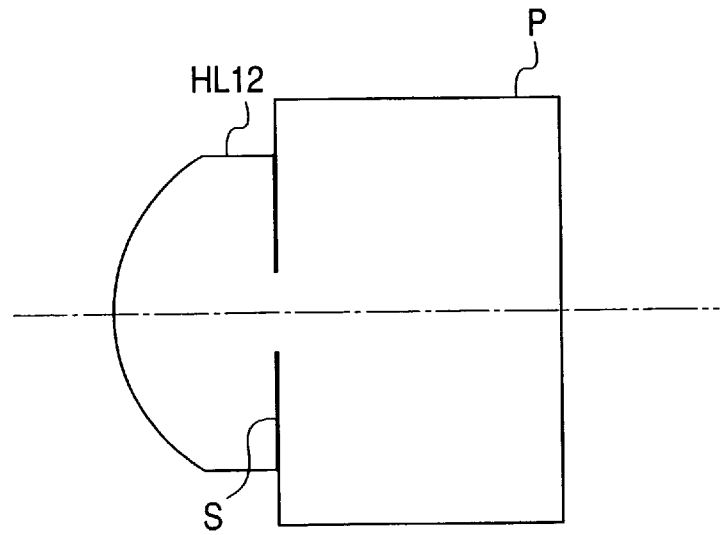

The eleventh embodiment has a composition illustrated in FIG. 22. This embodiment is composed of a convexo-planar lens element HL12 which has a convex spherical surface on the object side and is cemented to a planar glass plate P. Further, a stop is disposed between the convexo-planar lens element HL12 and the planar glass plate P. A paraxial imaging point for an object located at infinite distance is disposed on an image side surface of the planar glass plate P.

The eleventh embodiment has Numerical data which is listed below:

Embodiment 11
f = 4.0 mm, F/2.8, IH = 2.0 mm, 2ω = 52.8°

| $r_1 = 2.4186$ | | | |
|---|---|---|---|
| | $d_1 = 2.2701$ | $n_1 = 1.62041$ | $v_1 = 60.29$ |
| $r_2 = \infty$ (stop) | | | |
| | $d_2 = 4.0000$ | $n_2 = 1.51633$ | $v_2 = 64.14$ |
| $r_3 = \infty$ | | | |
| ds/f = 0.57 | | | |

In the numerical data of the embodiments, the d-line is adopted as a standard wavelength.

Figure 23:
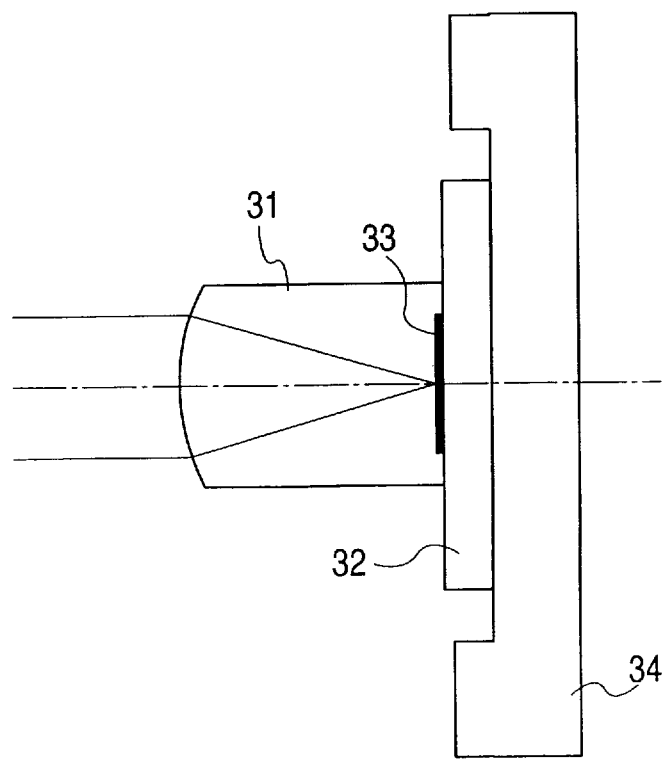
FIG. 23 shows a sectional view illustrating a composition of an optical module which uses the lens system preferred as the eighth embodiment.

FIG. 23 shows an image pickup module consisting of the lens system according to the present invention which has the fourth composition, or the lens system preferred as the eighth embodiment illustrated in FIG. 19, and is integrated with an image pickup device. In FIG. 23, a reference numeral 31 represents a lens system, a reference numeral 32 designates an image pickup chip of an image pickup device, a reference numeral 33 denotes an image pickup surface of the image pickup device and a reference numeral 34 represents a ceramic substrate: a planar final surface of the lens system 31 being cemented directly to the image pickup chip of the image pickup device. An epoxy cementing agent or the like is used to cement the image pickup chip to the lens system 31.

When this module is configured so as to form an image of an object located at a predetermined distance on the image pickup surface, the module can pick up the image.

Dependently on a depth of field, this module can pickup images of objects located within rather a broad range of distances shorter and longer than the predetermined distance.

Figure 24:
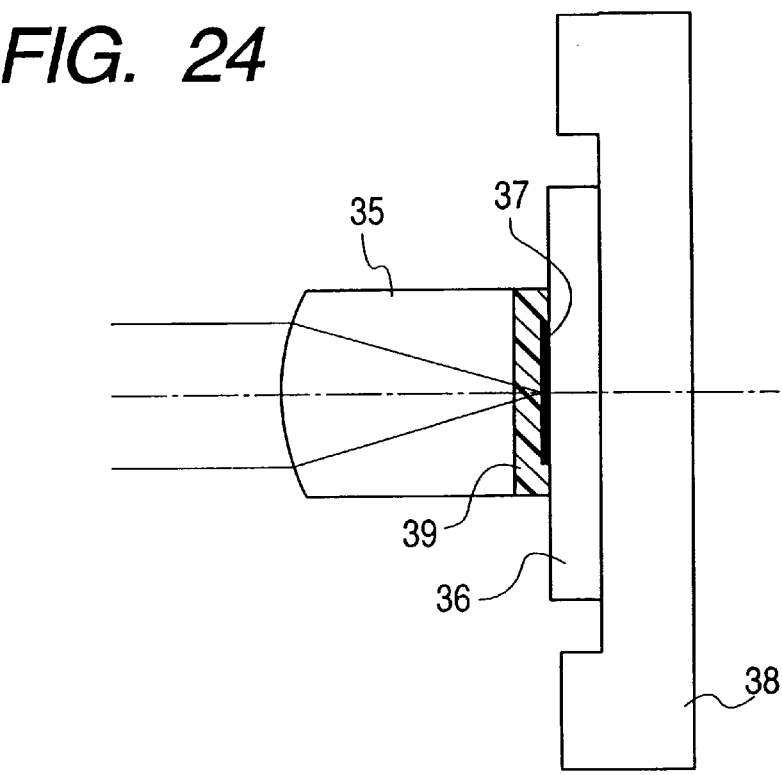
FIG. 24 shows a sectional view illustrating another example of module which uses a lens system according to the present invention having a fourth composition.
Figure 25:
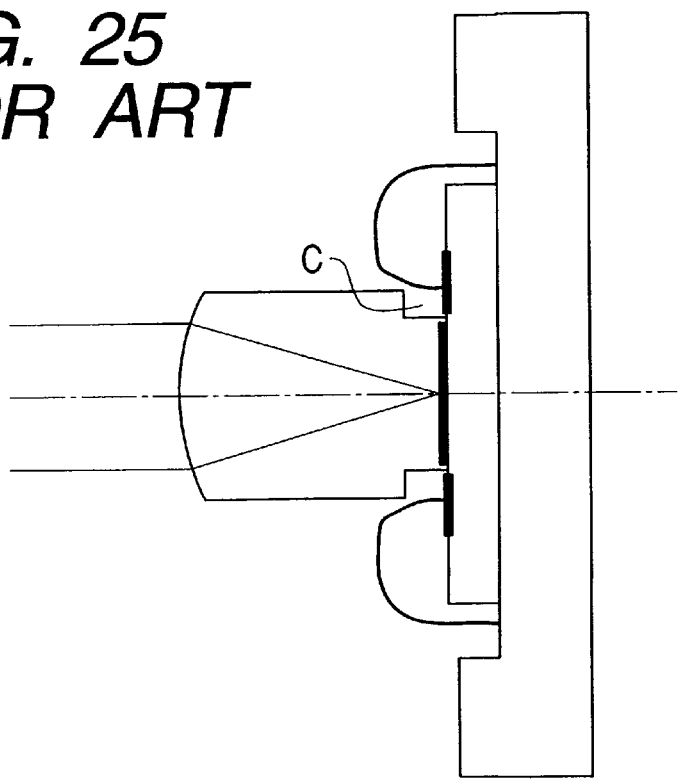
FIG. 25 shows a sectional view illustrating a wiring condition in a conventional image pickup module.

FIG. 24 shows a device in which the lens system having the fourth composition and the image pickup device are integrated with each other by filling a resin between the lens system and the image pickup device so as to bring an image side surface of the lens system into close optical contact with the image pickup surface.

In FIG. 24, a reference numeral 35 represents a lens system, a reference numeral 36 designates an image pickup chip of the image pickup device, a reference numeral 37 denotes an image pickup surface of the image pickup device, a reference numeral 38 represents a ceramic substrate for the image pickup device, and a reference numeral 39 designates a resin filled between the lens system 35 and the image pickup chip.

When the lens system is composed and a thickness of the resin 39 is adjusted so as to form an image of an object on the image pickup surface 37, it is capable of picking up an image of an object located at a predetermined distance. Dependently on a depth of field, this device is capable of picking up images of objects located within rather a broad range of distances shorter and longer than the predetermined distance.

After assembly of a lens system, its image surface may be deviated from an image pickup surface due to assembling errors of the lens system itself, a lens barrel and an image pickup surface of an image pickup device. It is therefore required to adjust the lens system by moving it so as to locate an image surface of the lens system on the image pickup surface after assembly of the lens system.

By configuring a device so as to have such a composition as that shown in FIG. 24, it is possible to suppress assembling errors of a lens system itself, a lens barrel and an image pickup surface of an image pickup device to extremely low levels, thereby easily coinciding an image surface of the lens system with the image pickup surface of the image pickup device.

In a conventional image pickup system, a low pass filter and an infrared cut filter are disposed after a lens system.

Low pass filter and infrared cut filters cannot be disposed in the image pickup devices according to the present invention illustrated in FIGS. 23 and 24 wherein the lens systems are integrated with the image pickup devices. However, it is possible to configure a lens element which composes a lens system so as to have function of an infrared cut filter and a function of a low pas filter as described below:

In order to configure a lens element so as to have a function of an infrared cut filter, it is conceivable to allow a material of the lens element to contain an element such as copper ion which absorbs infrared rays or coat an object side of the lens element with a material which cuts off infrared rays.

Further, in order to configure a lens element so as to have a function of a low pass filter, it is conceivable to utilize a method which enhances a spot image intensity distribution to an order of a level of a pitch of picture elements which produces moire by producing blurring due to aberrations in a lens system or diffraction or a method which forms moire effacing diffractive patterns on an object side of a lens element.

Now, description will be made of a composition of an IC chip of an image pickup device which is optimum for composing the image pickup module described above.

Bonding electrodes which are used to take out electric signals are ordinarily arranged around an image pickup surface of an image pickup and these electrodes are used in conditions where they are connected through wires. For the image pickup module described above, however, it is required to cut off portions of a final surface of the lens system which are optically unnecessary to reserve a space for wiring and prevent the lens element from interfering with wiring. In this case, it is required to work the lens element in a complicated form, thereby enhancing a manufacturing cost thereof.

Figure 26A:
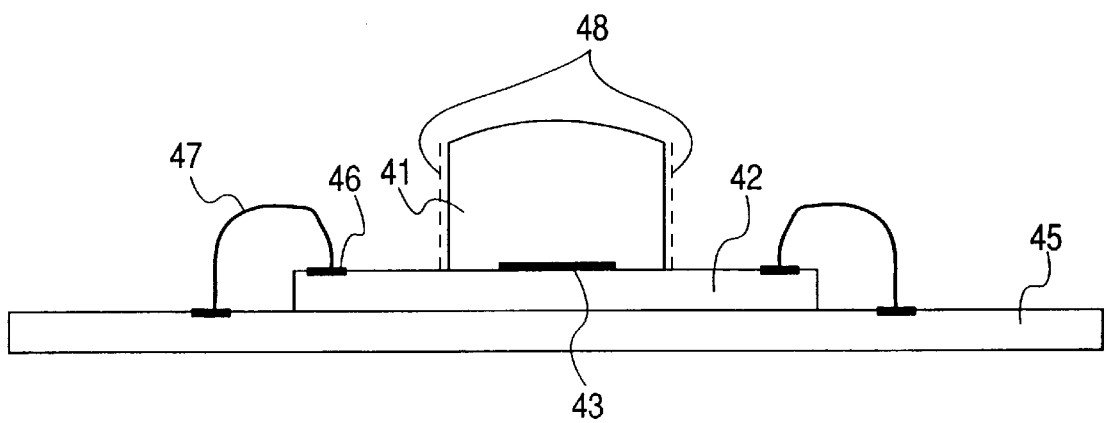
FIGS. 26A and 26B shows sectional views illustrating a wiring condition in an image pickup module according to the present invention.
Figure 26B:
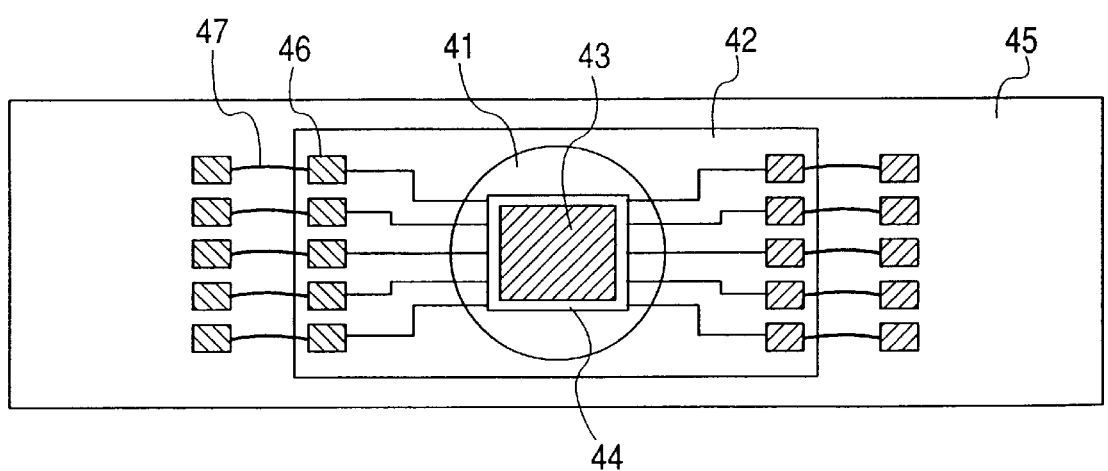

In order to correct the defect described above, the present invention adopts a configuration shown in FIGS. 26A and 26B. In these drawing, a reference numeral 41 represents a lens element, a reference numeral 42 designates a substrate for image pickup device (IC chip), a reference numeral 43 denotes an effective light photoelectric converter surface, a reference numeral 44 represents an ineffective photoelectric converter surface and a circuit group, a reference numeral 45 designates a flexible electric circuit board, a reference numeral 46 denotes bonding electrodes and a reference numeral 47 represents wires.

The bonding electrodes 46 are disposed apart from a close contact surface between the lens element 41 and the substrate 42 for image pickup device as shown in FIG. 23B so that the lens element 41 does not interfere with the wires 47 even in a condition where the lens element 41 is kept in close contact with the substrate 46. In order to obtain the image pickup module which has the configuration described above, it is desirable to configure the image pickup device as a two-dimensional image pickup device having a planar surface which sufficiently covers the effective photoelectric converter surface 43 of the substrate 42 for image pickup device and to which an area of the substrate 42 for image pickup device other than the bonding area can be bonded.

For the image pickup module shown in FIGS. 26A and 26B, it is preferable to cover side surfaces and a cementing surface of the lens element with a light shielding paint 48 for cutting off detrimental rays from the side surfaces.

Figure 27:
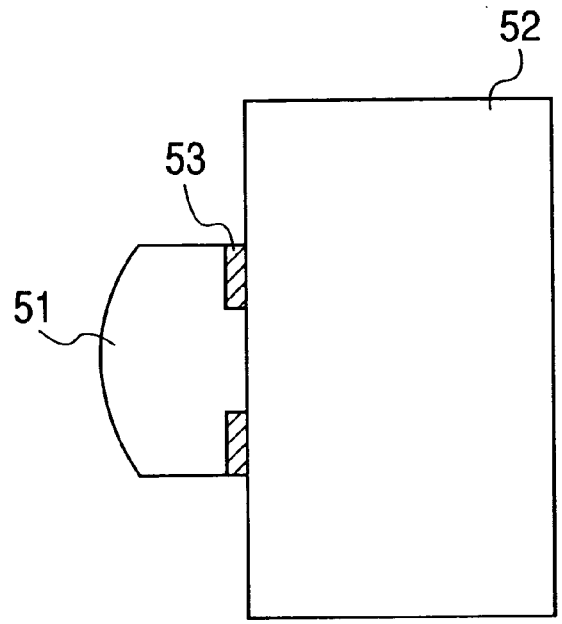
FIGS. 27 and 28 show sectional views illustrating lens systems according to the present invention each of which is composed of a convexo-planar lens element and a planar glass plate.
Figure 28:
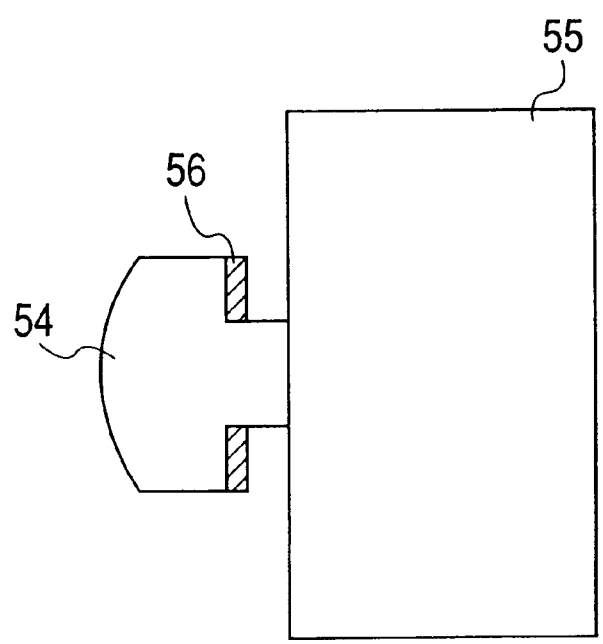

For the lens system shown in FIGS. 27 and 28, it is similarly preferable to cover side surfaces of the lens elements with a light shielding paint.

It is possible to obtain a lens system which is similar in optical composition to that of the lens system composed of the single lens element by cementing, in place of the lens element described above, a lens element which is made of a homogeneous medium and has a convexo-planar shape as shown in FIG. 27 or FIG. 28 to a planar glass plate. In other words, it is possible to compose a desired lens system by disposing, in order from the object side, a convexo-planar lens element 51 or 54 and a stop 53 or 56 in the lens element or on an image surface of the lens element, bringing a planar glass plate 52 or 55 into close contact with a planar surface of the convexo-planar lens element, and locating an image surface in the vicinity of a planar surface of the planar glass plate which is located on a side of the lens element as shown in FIGS. 27 or 28.

In this case, it is desirable to satisfy the following condition (7):

(7) $-0.5 \text{ mm} < \delta' < 20 \text{ mm}$ wherein the reference symbol $\delta'$ represents a deviation distance of the image surface as measured from an image side planar surface (surface located on a side opposite to the surface located on the side of the lens element) in a direction along an optical axis.

When the condition (7) is satisfied, it is possible to suppress degradation of an image quality to a low level when an image pickup device is used in a condition kept in close contact with the image side surface of the planar glass plate. If the upper limit or the lower limit of the condition (7) is exceeded, an image quality will be degraded remarkably. Further, the upper limit has an absolute value which is larger than that of the lower limit as in the case of the condition (6) since a deviation of the image surface rearward from the image side surface of the planar glass plate (deviation in a direction opposite to the lens element) can be corrected to a certain degree by a thickness of a layer of a bonding agent or a resin used to bring the image side surface of the planar glass plate into close contact with the image surface.

Furthermore, it is desirable to dispose an aperture stop at a location in the lens element or on the image side of the lens element which satisfies the following condition (5-1):

(5-1) $0.2 < ds/f < 0.8$

It is conceivable to dispose an aperture stop, as in the case of the lens system composed of a angle lens element, in a groove like waist portion formed in the convexo planar lens element.

Alternately, a stop can be formed by fitting and integrating a ring like light shielding member 53 between the convexoplanar lens element 51 and the planar glass planar plate 52 as shown in FIG. 27.

Moreover, a stop can be formed by working the convexoplanar lens element 54 so as to have a step and cementing a rink like light shielding member 56 as shown in FIG. 28.

Now, description will be made of an image pickup module which has a composition configured compact including an image pickup device and a holding structure therefor so that the image pickup module is compact as a whole.

Figure 29:
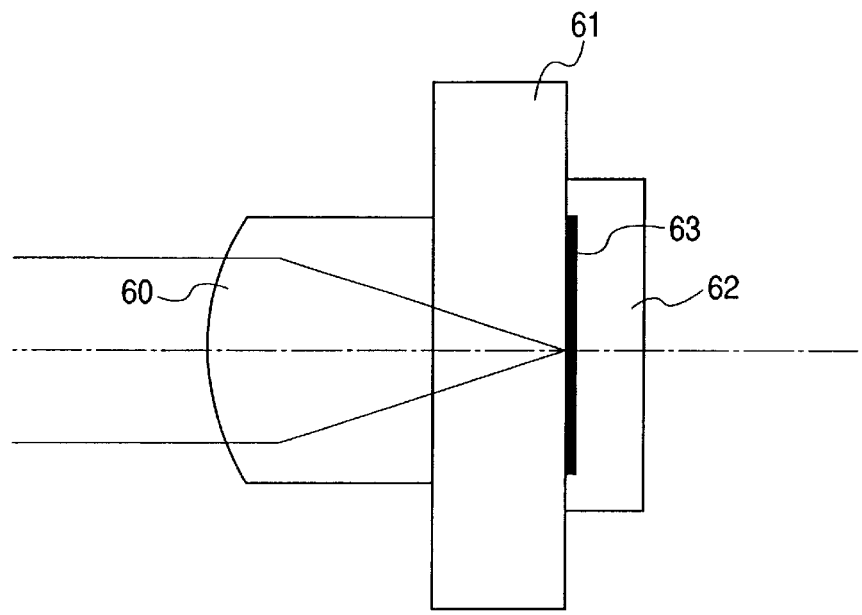
FIG. 29 shows a sectional view illustrating a composition of an image pickup module which uses a lens system cemented to a planar glass plate.

FIG. 29 shows an example of such an image pickup module in which an image pickup surface 53 of an image pickup device 62 is kept in close contact with an image side planar surface of a planar glass substrate 61 so that an image is formed on the image pickup surface. By arranging an image pickup device as described above, it is possible to use the planar glass substrate 61 as a substrate for holding the image pickup module as a whole.

Figure 30:
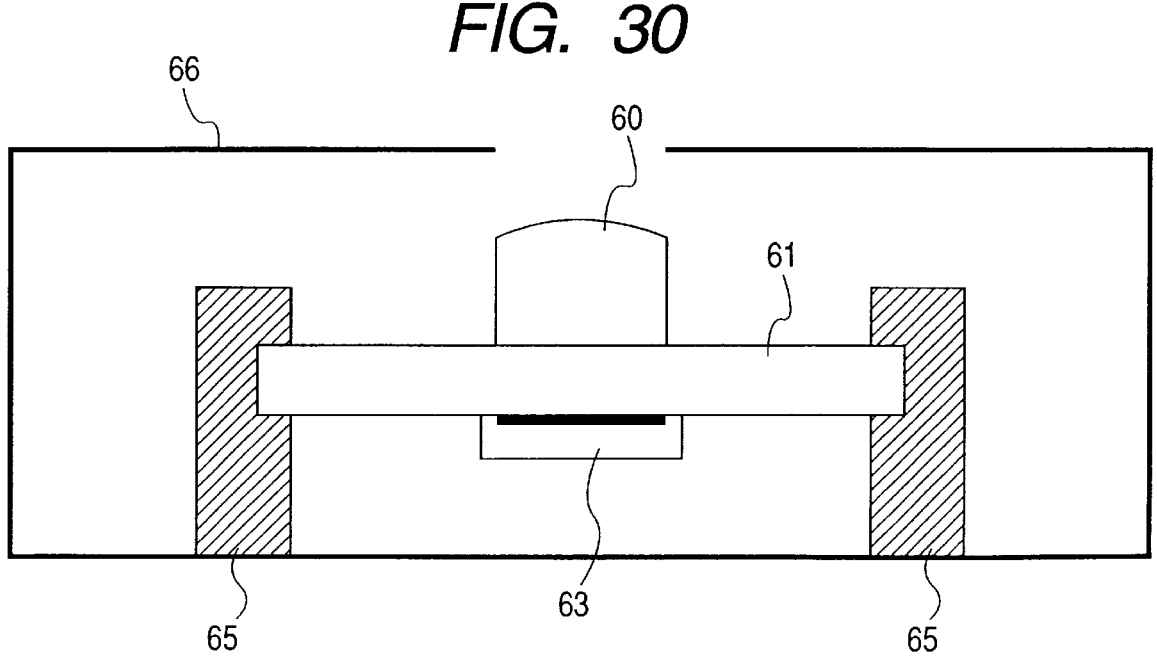
FIG. 30 a sectional view illustrating another image pickup module which uses a lens element cemented to a planar glass plate.

FIG. 30 shown another example wherein a planar glass substrate is used as a substrate for holding an image pickup module as a whole.

In FIG. 30, a reference numeral 60 represents a lens system, a reference numeral 61 designates a planar glass plate, a reference numeral 63 denotes an image pickup device, a reference numeral 65 represents a substrate holding member and a reference numeral 66 designates a camera.

An electronic image pickup optical system ordinarily requires an infrared ray cut filter or a low pass filter disposed therein. The image pickup module according to the present invention can have a function of such a filter. In order to impart a function of an infrared cut filter, it is sufficient to configure a convexo-planar lens element or a planar glass plate so as to contain ions of a metal such as copper.

Another method to impart a function of an infrared ray cut filter is to form an infrared ray cutting coat on an object side surface of a convexo-planar lens element.

In order to impart a function of a low pass filter to the image pickup module according to the present invention, there is available a method to use a quartz low filter in place of a planar glass plate, a method to enhance a spot image intensity distribution to a level on the order of a pitch of images by producing aberrations in a lens system or moire in a spot image intensity distribution due to diffractive blurring or a method to form diffractive patterns for erasing moire on an object side surface of a lens element.

Now, description will be made of another image pickup module according to the present invention. When two optical system are required for stereoscopic image pickup or automatic focusing, it is necessary to accurately align these two optical systems, thereby requiring tedious procedures and constituting a cause for enhancement in a manufacturing cost. As an image pickup module which requires two optical systems, an image pickup module for stereoscopic photography or a phase detection automatic focusing will be described.

In a conventional optical system for electrically carrying out stereoscopic image pickup or phase detection automatic focusing, it is general to attach two separate lens systems to separate image pickup devices and align these two lens systems. It is therefore necessary to align the two lens systems.

According to the present invention, two image pickup areas 73 and 74 are located on a planar surface of a substrate 72 for device, two lens systems 70 and 71 are configured so as to have planar final surfaces and image surfaces located in the vicinities of these planar surfaces, and image pickup surfaces of the two lens system are bonded directly to the two image pickup areas as shown in FIG. 31. Accordingly, optical axes of the two optical systems can easily be set in parallel with each other, thereby facilitating alignment of the optical systems.

The substrate 72 for device is a planar plate like the wafer made of silicon or the like on which electric circuit patterns are formed, and functions to pickup an image, to emit light and to receive light. Each of the lens systems used in this image pickup module is the lens system according to the present invention which is composed of a convexo-planar lens element, and a combination of a convexo-planar lens element and a planar glass plates. Each of these lens systems is integrated and can be cemented to the substrate for image pickup device without using a lens barrel.

This lens system according to the present invention is, for example, the lens system preferred as the eighth, ninth, tenth or eleventh embodiment and is usable as an ordinary image pickup optical system when an image pickup device such as a CCD is disposed at an image pickup location of the lens system or as a display optical system when a display device such as an LCD is disposed at an imaging location of the lens system.

FIG. 32 shows a configuration to use the lens system according to the present invention in combination with a display device. A display device 80 is kept in close contact with a lens system 81 so that rays coming from the display device 80 are formed by the lens system into a parallel light bundle.

An eye which is placed close to the lens systems 81 can observe a magnified image of a pattern formed on the display device. A reference numeral 83 represents back light.

The present invention provides an optical system for optical instruments which is composed of a small number of lens elements and can be manufactured at a low cost. Further, the present invention makes it possible to obtain an optical module for stereoscopic photography, automatic focusing and so on with easily alignment.

What is claimed is:

1. An optical system consisting of, in order from the object side:
   a radial type gradient index lens element which has a negative refractive power of medium and a negative refractive power as a whole; and
   a radial type gradient index lens element which has a positive power of medium and a positive refractive power as a whole, wherein said optical system satisfies the following conditions (1) and (2):

(1) $|1/V_{1n}|<0.02$ (2) $|1/V_{1p}|<0.02$ wherein the reference symbol $V_{1n}$ represents an Abbe's number of a medium of said radial type gradient index lens element which has the negative refractive power and the reference symbol $V_{1p}$ designates an Abbe's number of said radial type gradient index lens element which has the positive refractive power.

2. An optical system according to claim 1, wherein a stop is disposed between said radial type gradient index lens element which has the negative refractive power and said radial type gradient index lens element which has the positive refractive power.

3. An optical system comprising, in order from the object side: a radial type gradient index lens element which has a negative refractive power of medium and a negative refractive power as a whole; and
   a radial type gradient index lens element which has a positive power of medium and a positive refractive power as a whole,
   wherein said optical system satisfies the following conditions (1), (2) and (3):

(1) $|1/V_{1n}|<0.02$ (2) $|1/V_{1p}|<0.02$ (3) $0.15<d(p)/p<0.40$ wherein the reference symbol $V_{1n}$ represents an Abbe's number of a medium of said radial type gradient index lens element which has the negative refractive power, the reference symbol $V_{1p}$ designates an Abbe's number of said radial type gradient index lens element which has the positive refractive power, the reference symbol d(p) represents a center thickness of said radial type gradient index lens element which has the positive refractive power and the reference symbol p designates a pitch of a material of the radial type gradient index lens element which is given by the following equation:

$$p=2\,\pi\{N_0/-2N_1\}^{1/2}$$

wherein the reference symbol $N_0$ represents a refractive index on an optical axis of the radial type gradient index lens element and the reference symbol $N_1$ designates a distribution coefficient of the second order of the radial type gradient index lens element.

4. An optical system according to claim 3 satisfying the following condition (4):

(4) $|\Delta n|<0.1$ wherein the reference symbol $\Delta n$ represents a maximum refractive index difference of the radial type gradient index lens element.

5. An optical system according to claim 4, wherein said radial type gradient index lens element which has the negative refractive power and said radial type gradient index lens element which has the positive refractive power are cemented to each other.

6. An optical system according to claim 2 or 4, wherein said radial type gradient index lens element which has the negative refractive power and said radial type gradient index lens element which has the positive refractive power are cemented to each other.

7. An optical system according to claim 3, wherein said radial type gradient index lens element which has the negative refractive power and said radial type gradient index lens element which has the positive refractive power are cemented to each other.

8. An optical system according to claim 7, wherein each of said radial type gradient index lens element which has the negative refractive power and said radial type gradient index lens element which has the positive refractive power has two planar surfaces.

9. An optical system according to claim 3, wherein each of said radial type gradient index lens element which has the negative refractive power and said radial type gradient index lens element which has the positive refractive power has two planar surfaces.

10. An optical system according to claim 1 or 2 satisfying the following condition (4):

(4) $|\Delta n|<0.1$ wherein the reference symbol $\Delta n$ represents a maximum refractive index difference of the radial type gradient index lens element.

11. An optical system according to claim 10, wherein said radial type gradient index lens element which has the negative refractive power and said radial type gradient index lens element which has the positive refractive power are cemented to each other.

12. An optical system according to claim 11, wherein each of said radial type gradient index lens element which has the negative refractive power and said radial type gradient index lens element which has the positive refractive power has two planar surfaces.

13. An optical system according to claim 2, 7 or 11, wherein each of said radial type gradient index lens element which has the negative refractive power and said radial index lens element which has the positive refractive power has two planar surfaces.

14. An optical system according to claim 10, wherein each of said radial type gradient index lens element which has the negative refractive power and said radial type gradient index lens element which has the positive refractive power has two planar surfaces.

15. An optical system comprising, in order from the object side:

- a radial type gradient index lens element which has a negative refractive power of medium and a negative refractive power as a whole; and
- a radial type gradient index lens element which has a positive power of medium and a positive refractive power as a whole,
- wherein said radial type gradient index lens element which has the negative refractive power and said radial type gradient index lens element which has the positive refractive power are cemented to each other, and wherein said optical system satisfies the following conditions (1) and (2):

(1) $|1/V_{1n}|<0.02$ (2) $|1/V_{1p}|<0.02$ wherein the reference symbol $V_{1n}$ represents an Abbe's number of a medium of said radial type gradient index lens element which has the negative refractive power and the reference symbol $V_{1n}$ designates an Abbe's number of said radial type gradient index lens element which has the positive refractive power.

16. An optical system according to claim 15, wherein each of said radial type gradient index lens element which has the negative refractive power and said radial type gradient index lens element which has the positive refractive power has two planar surfaces.

17. An optical system comprising, in order from the object side:

- a radial type gradient index lens element which has a negative refractive power of medium and a negative refractive power as a whole; and
- a radial type gradient index lens element which has a positive power of medium and a positive refractive power as a whole,
- wherein each of said radial type gradient index lens element which has the negative refractive power and said radial index lens element which has the positive refractive power has two planar surfaces, and wherein said optical system satisfies the following conditions (1) and (2):

(1) $|1/V_{1n}|<0.02$ (2) $|1/V_{1p}|<0.02$ wherein the reference symbol $V_{1n}$ represents an Abbe's number of a medium of said radial type gradient index lens element which has the negative refractive power and the reference symbol $V_{1n}$ designates an Abbe's number of said radial type gradient index lens element which has the positive refractive power.

18. An optical system comprising:

- a lens system comprising a plurality of lens elements; and
- an image pickup device or a display device, wherein lens elements of said plurality of lens elements that are adjacent to each other are kept in close contact or cemented with or to one another or an airspace reserved therebetween is filled with a resin, and wherein an image side lens element out of said plurality of lens elements is kept in close contact or cemented with said image pickup device or the display device or an airspace reserved between said image side lens element and said image pickup device or the display device is filled with a resin.

19. An optical system according to claim 18, wherein at least one lens element of said lens system is a radial type gradient index lens element.

20. An optical system according to claim 18, wherein said lens system comprises three homogeneous lens elements.

21. An optical module comprising:

- two lens systems; and
- a substrate for a device,
- wherein each of final surfaces of said two lens systems is kept in close contact with a surface of said substrate for said device so as to integrated said two lens systems with said substrate for said device.

22. An optical nodule according to claim 21, wherein each of said two lens systems comprises a radial type gradient index lens element.

23. An optical module according to claim 21,

- wherein said substrate for said device has two image pickup areas, and
- wherein said substrate for said device is integrated with said two lens systems by bringing the final surfaces of said two lens systems into close contact with said two image pickup areas, whereby stereoscopic photography can be carried out with said two image pickup areas.

24. An optical module according to claim 21, wherein said substrate for said device has two image pickup areas, and wherein said substrate for said device is integrated with said two lens systems by bringing the final surfaces of said two lens systems into close contact with said two image pickup areas, whereby phase signals for automatic focusing are obtained from signals provided from said image pickup areas.

25. An optical module according to claim 21, wherein said substrate for said device has two image pickup areas, and wherein said substrate for said device is integrated with said two lens systems by bringing the final surfaces of said two lens systems into close contact with said two image pickup areas, whereby signals for automatic focusing are obtained from electric signals provided from said image pickup areas using a triangulational principle.

26. An optical system comprising, in order from the object side:

- a radial type gradient index lens element which has a negative refractive power of medium and a negative refractive power as a whole;
- a radial type gradient index lens element which has a positive power of medium and a positive refractive power as a whole; and
- a stop, disposed between said radial type gradient index lens element which has the negative refractive power and said radial type gradient index lens element which has the positive refractive power, wherein said optical system satisfies the following conditions (1), (2) and (3):

(1) $|1/V_{1n}|<0.02$ (2) $|1/V_{1p}|<0.02$ (3) $0.15<d(p)/p<0.40$ wherein the reference symbol $V_{1n}$ represents an Abbe's number of a medium of said radial type gradient index lens element which has the negative refractive power and the reference symbol $V_{1p}$ designates an Abbe's number of said radial type gradient index lens element which has the positive refractive power, the reference symbol d(p) represents a center thickness of said radial type gradient index lens element which has the positive refractive power and the reference symbol p designates a pitch of a material of the radial type gradient index lens element which is given by the following equation:

$$p=2\pi\{N_0/-2N_1\}^{1/2}$$

wherein the reference symbol $N_0$ represents a refractive index on an optical axis of the radial type gradient index lens element and the reference symbol $N_1$ designates a distribution coefficient of the second order of the radial type gradient index lens element.

* * * * *